(12) United States Patent
Yamaguchi et al.

(10) Patent No.: US 10,899,040 B2
(45) Date of Patent: Jan. 26, 2021

(54) CONTINUOUS TWIN-SCREW MIXER AND MIXING METHOD

(75) Inventors: Kazuo Yamaguchi, Takasago (JP); Takaya Uda, Takasago (JP); Yoshinori Kuroda, Takasago (JP); Tsugushi Fukui, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 517 days.

(21) Appl. No.: 13/810,672

(22) PCT Filed: Jul. 27, 2011

(86) PCT No.: PCT/JP2011/004247
§ 371 (c)(1),
(2), (4) Date: Jan. 17, 2013

(87) PCT Pub. No.: WO2012/017619
PCT Pub. Date: Feb. 9, 2012

(65) Prior Publication Data
US 2013/0163373 A1 Jun. 27, 2013

(30) Foreign Application Priority Data

Aug. 5, 2010 (JP) .................................. 2010-176288

(51) Int. Cl.
*B29B 7/48* (2006.01)
*B29C 48/655* (2019.01)
(Continued)

(52) U.S. Cl.
CPC .............. *B29B 7/488* (2013.01); *B29B 7/465* (2013.01); *B29B 7/482* (2013.01); *B29B 7/489* (2013.01); *B29C 48/655* (2019.02); *B29C 48/67* (2019.02)

(58) Field of Classification Search
CPC . B29C 47/402; B29C 47/627; B29C 47/0861; B29B 7/482; B29B 7/483
(Continued)

(56) References Cited

U.S. PATENT DOCUMENTS 3,447,582 A * 6/1969 Street ........................ B01J 10/02
159/2.2
3,900,187 A * 8/1975 Loomans ........................ 366/85
(Continued)

FOREIGN PATENT DOCUMENTS

EP 0 391 003 A2 10/1990
EP 0 391 003 A3 10/1990
(Continued)

OTHER PUBLICATIONS

Extended Search Report dated Jun. 4, 2014 in European Patent Application No. 11814257.9.
(Continued)

*Primary Examiner* — Marc C Howell
(74) *Attorney, Agent, or Firm* — Oblon, McClelland, Maier & Neustadt, L.L.P.

(57) ABSTRACT

A continuous mixer includes a barrel with a hollow interior, and a pair of mixing rotors housed in the barrel and that rotate in mutually different directions, each mixing rotor including a mixing portion with plural mixing flights formed about an axial center of the mixing rotor and projecting radially outward. The mixing rotors have a center distance therebetween smaller than a rotation outer diameter of each of the respective mixing flights. An inter-rotor clearance, which is the smallest clearance between the mixing portions at each rotation phase of the mixing rotors in a cross section perpendicular to axial directions of the both mixing rotors, has a dimension allowing an extensional flow to be generated in a material passing through the inter-rotor clearance.

(Continued)

The continuous mixer can reliably and efficiently mix a material having a large viscosity difference between a dispersed phase and a matrix phase.

18 Claims, 13 Drawing Sheets

(51) Int. Cl.
*B29B 7/46* (2006.01)
*B29C 48/67* (2019.01)

(58) Field of Classification Search
USPC .................................................. 366/85, 301
See application file for complete search history.

(56) References Cited

U.S. PATENT DOCUMENTS

| | | | | |
|---|---|---|---|---|
| 4,040,607 | A | * | 8/1977 | Ullrich ............................ 366/85 |
| 4,084,263 | A | | 4/1978 | Millauer |
| 4,970,037 | A | * | 11/1990 | Kafka et al. ................... 264/101 |
| 5,487,602 | A | | 1/1996 | Valsamis et al. |
| 5,947,593 | A | * | 9/1999 | Inoue ...................... B29C 47/38 366/84 |
| 6,086,925 | A | * | 7/2000 | Song ........................ A23G 4/02 426/3 |
| 6,783,270 | B1 | * | 8/2004 | Padmanabhan ................ 366/82 |
| 2003/0206482 | A1 | * | 11/2003 | Griggs ............................ 366/81 |
| 2009/0161476 | A1 | | 6/2009 | Narukawa et al. |
| 2009/0213681 | A1 | * | 8/2009 | Ek et al. ...................... 366/76.1 |

FOREIGN PATENT DOCUMENTS

| | | |
|---|---|---|
| JP | 49-081958 | 8/1974 |
| JP | 59-123520 | 7/1984 |
| JP | 59-124804 | 7/1984 |
| JP | 59-147629 | 8/1984 |
| JP | 2 263609 | 10/1990 |
| JP | 4-171033 | 6/1992 |
| JP | 5-50425 | 3/1993 |
| JP | 5 50425 | 3/1993 |
| JP | 5-72806 | 3/1993 |
| JP | 07-032354 A | 2/1995 |
| JP | 9 85804 | 3/1997 |
| JP | 10 235636 | 9/1998 |
| JP | 10-235636 | 9/1998 |
| JP | 10 264148 | 10/1998 |
| JP | 2006 321859 | 11/2006 |
| JP | 2009 148936 | 7/2009 |

OTHER PUBLICATIONS

International Search Report dated Sep. 6, 2011 in PCT/JP11/04247 Filed Jul. 27, 2011.

* cited by examiner

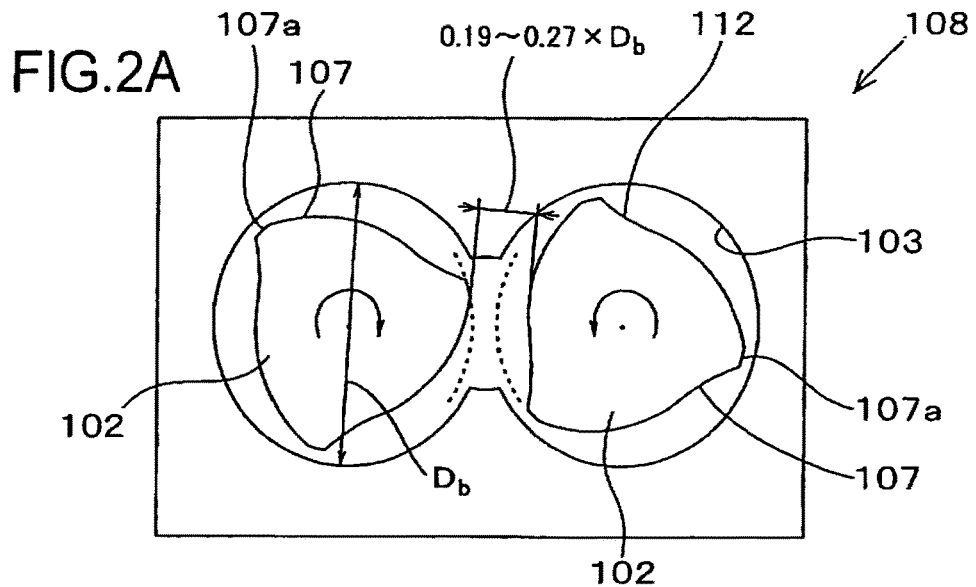
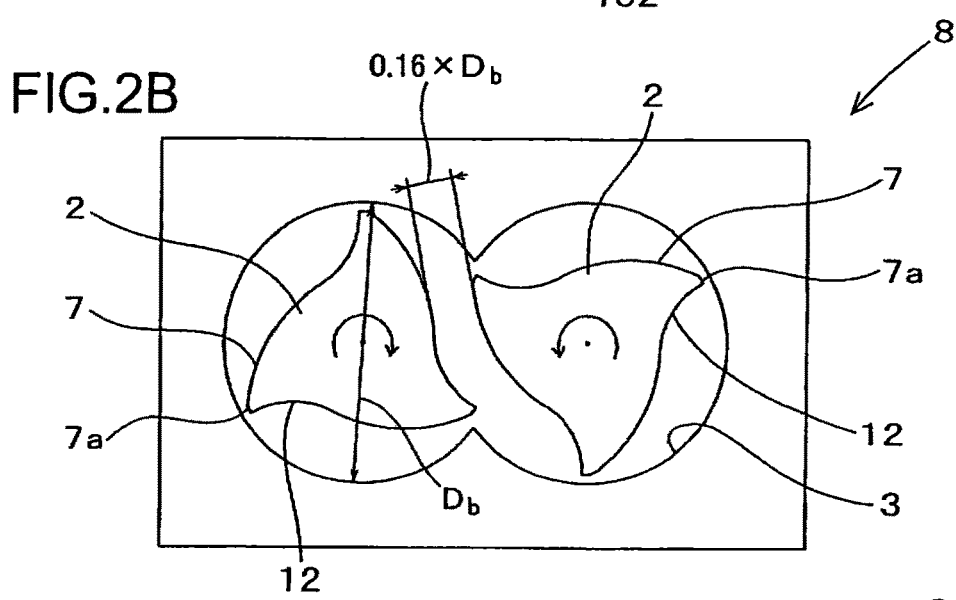
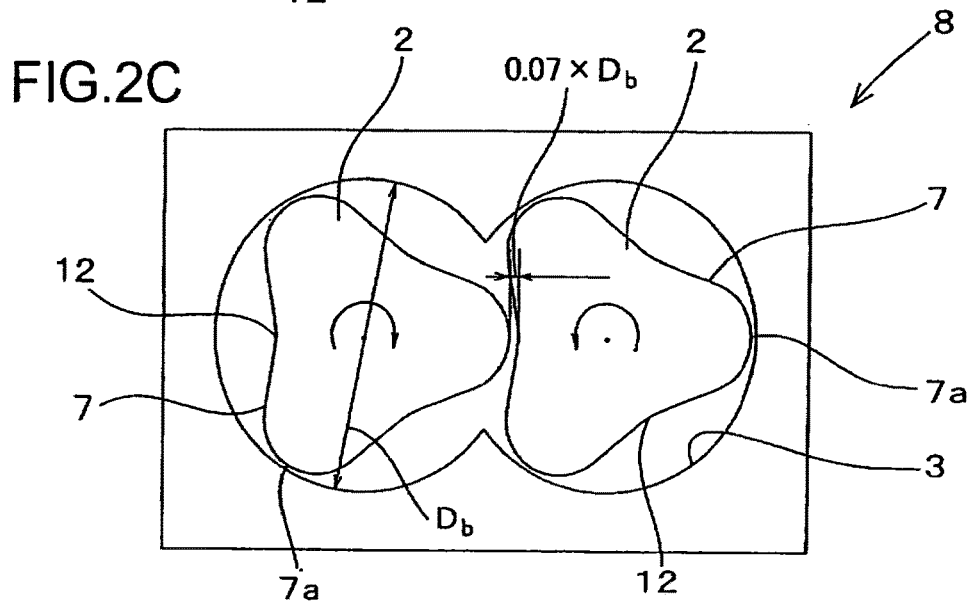

FIG.3A
FIG.3B
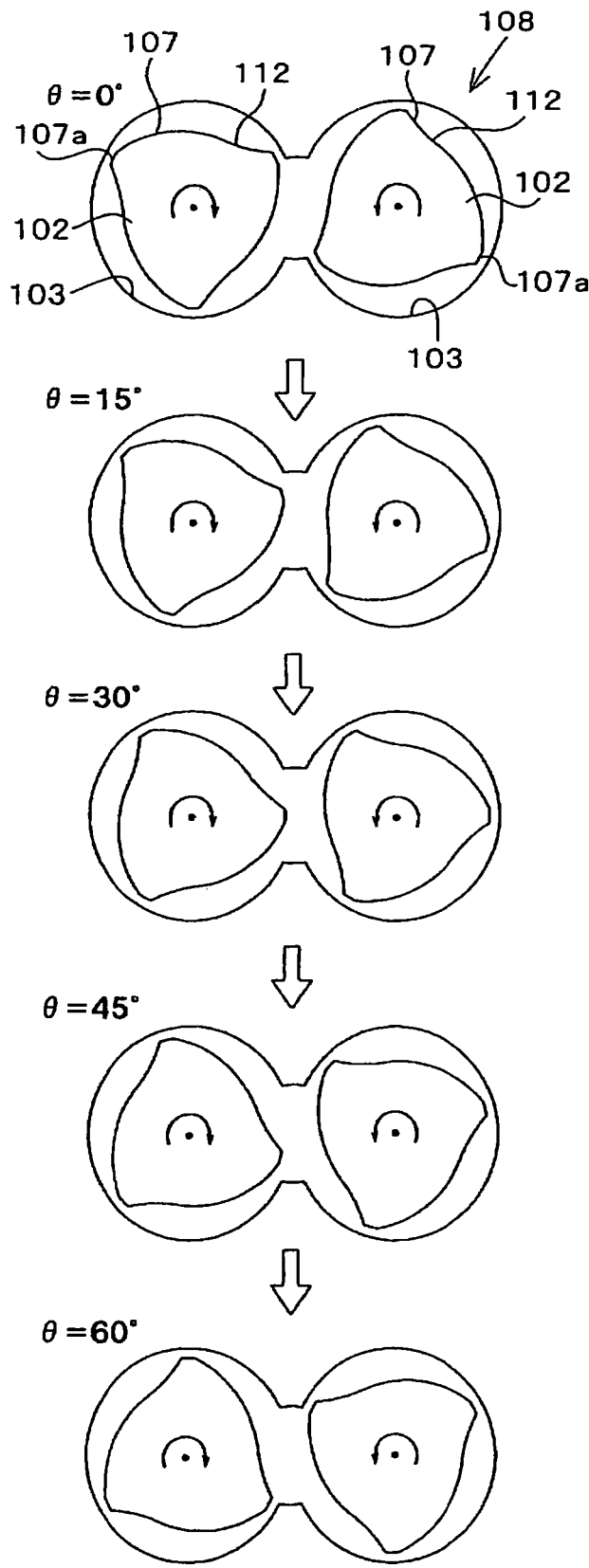
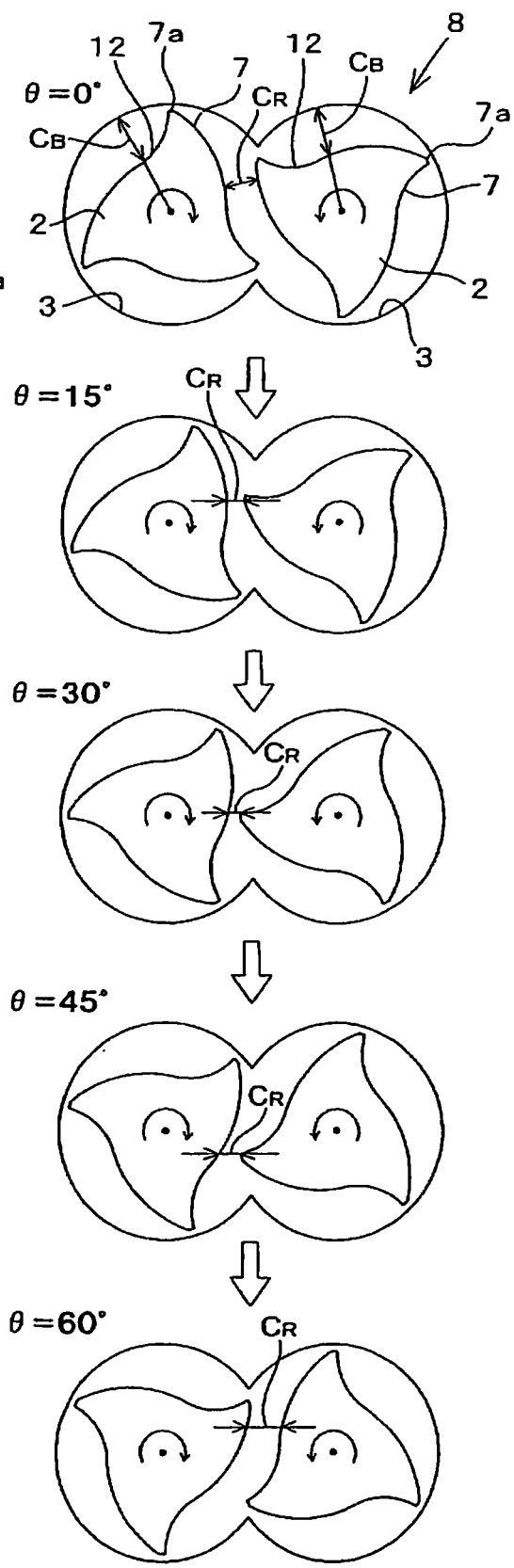

FIG.6A
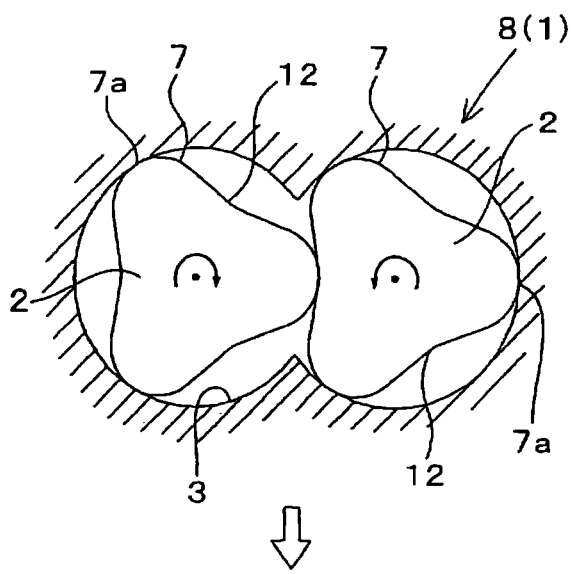
FIG.6B
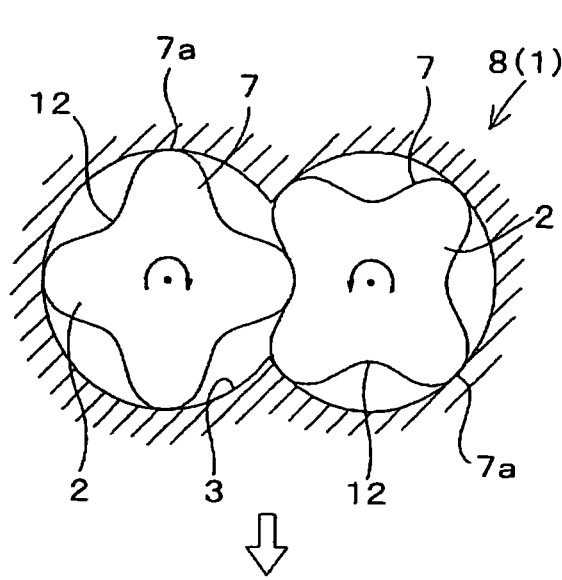
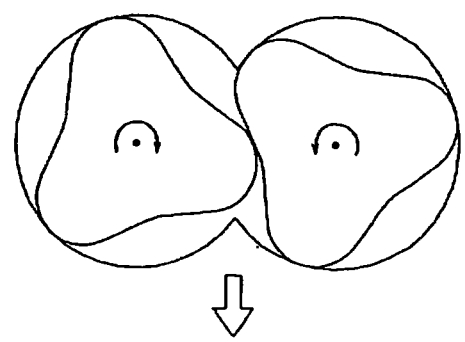
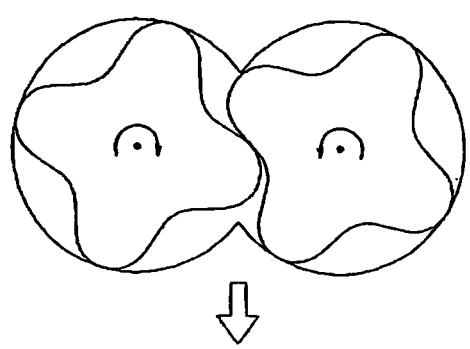
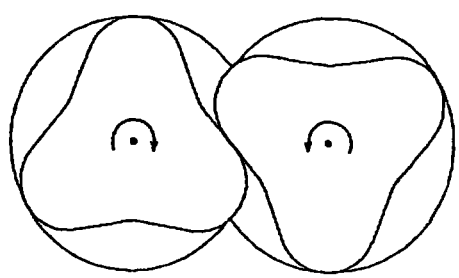
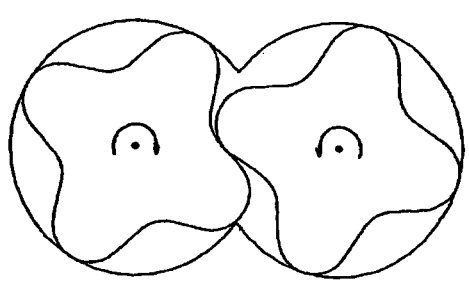
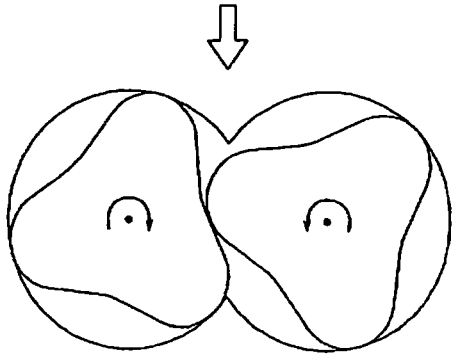
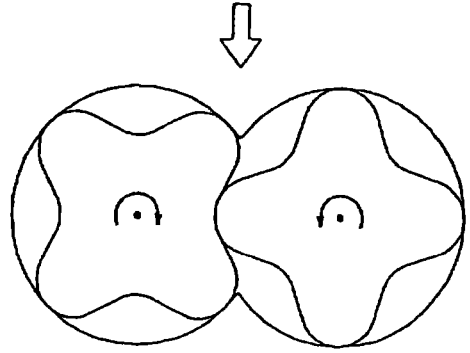

FIG.7A
FIG.7B
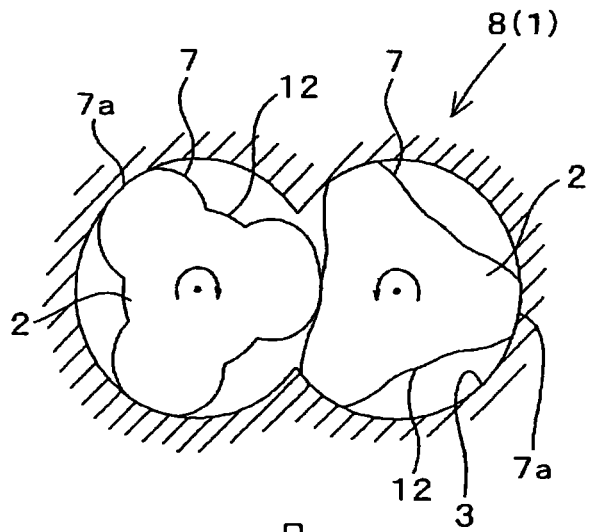
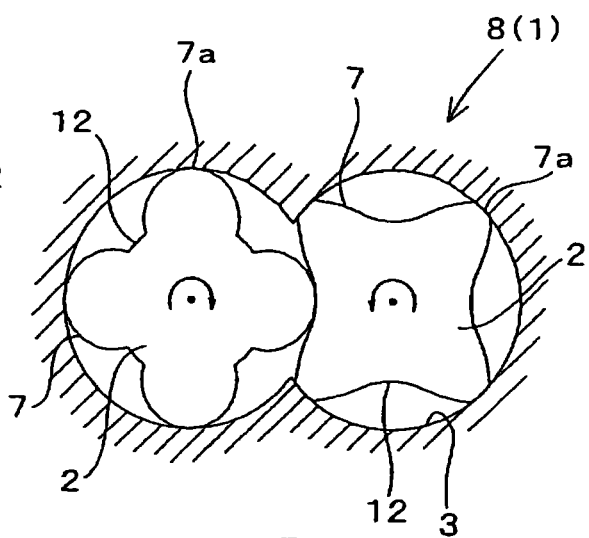
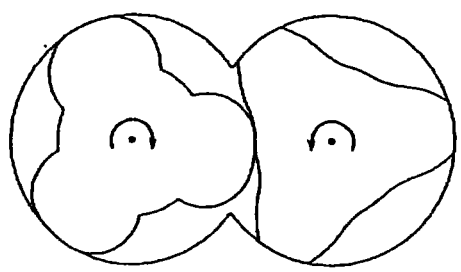
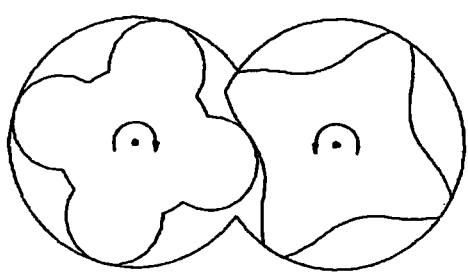
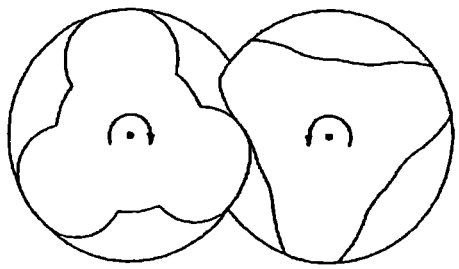
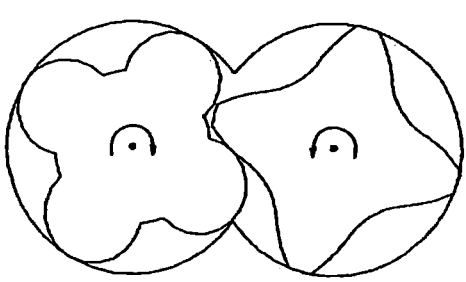
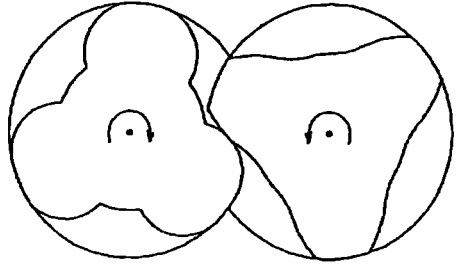
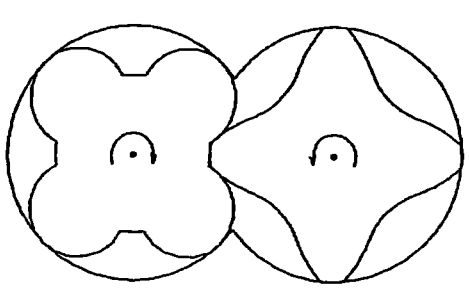

FIG.8A
FIG.8B
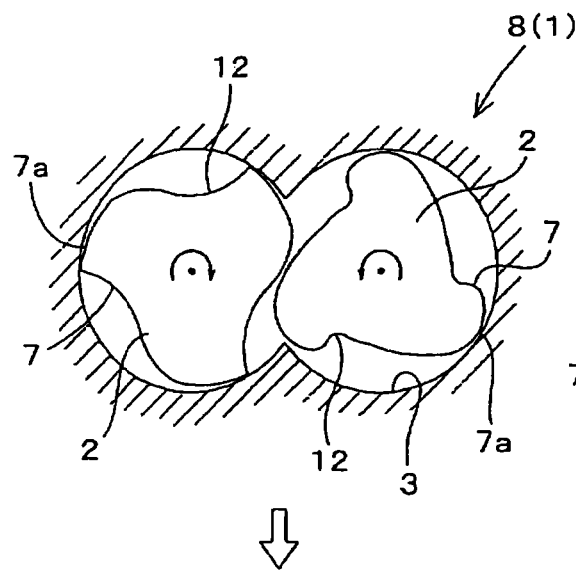
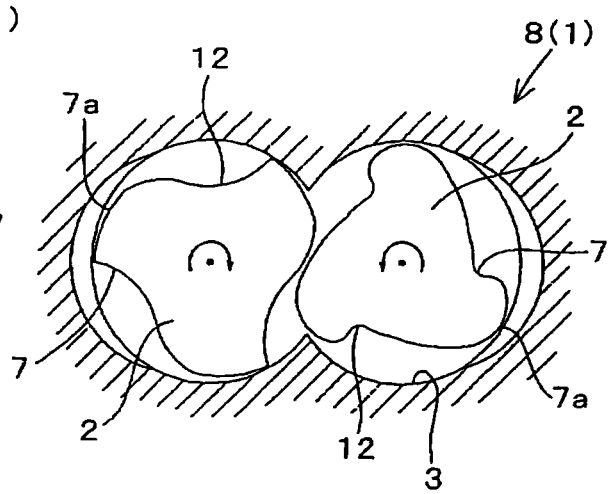

FIG.13
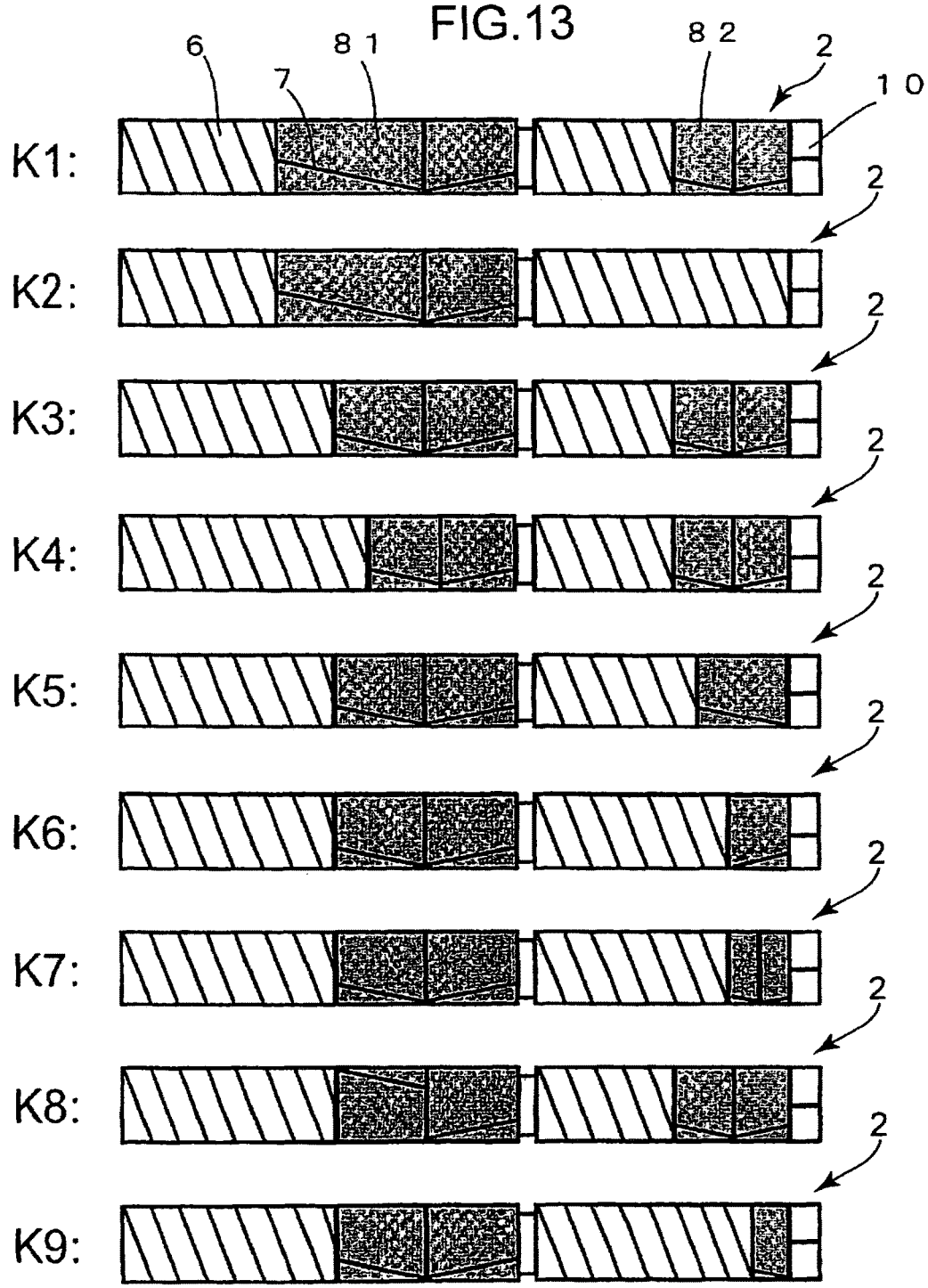
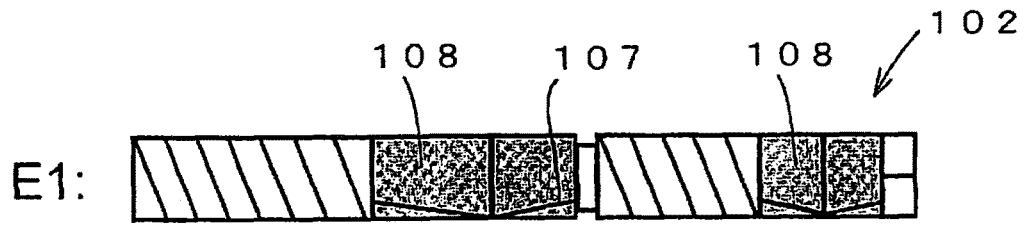

CONTINUOUS TWIN-SCREW MIXER AND MIXING METHOD

TECHNICAL FIELD

The present invention relates to a continuous mixer and a mixing method for mixing a resin material using mixing rotors which rotate in mutually different directions.

BACKGROUND ART

Generally, a continuous mixer including a barrel into which a material such as polymer resin pellets and a powdered additive are supplied; and a pair of mixing rotors inserted into this barrel, feeds the material to a downstream side while mixing the material between mixing portions respectively provided in these mixing rotors.

In recent years, the development of new composite resin materials and the like has increased the number of kinds of materials to be mixed and needs for the continuous mixers to perform improved mixing. Such needs include, for example, uniform dispersion or diffusion of a filler, an additive and the like in a material, an improvement in the dispersion structure of a polymer alloy, an improvement in reaction homogeneity at the time of reactive extrusion, an improvement in responsiveness and destruction of fish eyes and a gel at the time of mixing. To respond to such needs, it is required to further improve performance such as plasticization, mixing or homogenization.

For example, patent literature 1 discloses a two-axis mixer including a barrel and a pair of mixing rotors which rotate in mutually different directions, wherein mixing flights are provided on mixing portions. The mixing flights form small tip clearances between them and the inner peripheral surface of the barrel respectively, causing a largely shear deformation in a material passing through the tip clearances.

On the other hand, patent literature 2 discloses a two-axis mixer including a barrel and a pair of mixing rotors which rotate in the same direction, wherein mixing flights are provided on mixing portions. The mixing flights in this mixer also include respective tips; not only tip clearances are formed between these tips and the inner peripheral surface of the barrel, but also, between the mixing rotors, a clearance capable of causing a shear deformation in a material is formed. In this clearance between the mixing rotors, the outer peripheral surface (wall surface of the tip) of one mixing rotor and the outer peripheral surface (wall surface of the tip) of the other mixing rotor move in mutually different directions, thereby causing a great shear deformation (deformation in a tearing direction) in the material.

Either of the continuous mixers disclosed in patent literatures 1 and 2, which can give a large shear force to the material in the tip clearances and the clearance between the rotors as described above, has exhibited sufficient mixing performance for many kinds of resins thus far. However, it has become apparent that composite resin materials and mixing resistant polymer alloys in which a filler having been developed in recent years and having a strong cohesive force is mixed, and materials which require reliable dispersion or destruction of a gel, cannot be sufficiently mixed by only a large shear force.

This is because such a mixing resistant material has a large viscosity difference between a dispersed phase and a matrix phase therein, which prevents a shear force applied to the matrix phase from effectively acting on the dispersed phase. For example, a shear force applied to the material is expended to rotate the dispersed phase in a matrix, which makes it impossible to give a deformation amount necessary for dispersion to the dispersed phase. In short, such a mixing resistant material does not permit mixing energy applied to the material to be efficiently expended for mixing. If an operating condition and a screw shape are changed to enable the dispersed phase to be effectively dispersed in addition to being given a large shear force, the shear force will causes in the material a heat which can bring the material into thermal deterioration. This is undesirable because of environmental and economical loss.

CITATION LIST

Patent Literatures

[Patent literature 1] Japanese Unexamined Patent Publication No. H10-264148
[Patent literature 1] Japanese Unexamined Patent Publication No. 2009-148936

SUMMARY OF INVENTION

The present invention has been developed in view of the above problems, and an object thereof is to provide a continuous mixer and a mixing method capable of reliably and efficiently mixing even a material having a large viscosity difference between a dispersed phase and a matrix phase therein.

To accomplish this object, the present inventors focused on the fact that, in a continuous mixer including a pair of mixing rotors which rotate in mutually different directions, the respective surfaces of the mixing rotors move in the same direction at a limited position between mixing portions of the both mixing rotors (position where the both mixing portions face each other). For example, at the position between the both mixing portions, when the surface of one mixing portion moves downward from an upper side, the surface of the other mixing portion also moves downward. For this reason, the present inventors thought that engaging the mixing portions of the pair of mixing rotors so as to skillfully utilize an inter-rotor clearance formed between both mixing portions would enable a material to be pulled into a region between both mixing portions, to be deformed to extend according to the width of the clearance, thereby generating an extensional flow in the material. Then, the present inventors have found that setting the inter-rotor clearance to a dimension which allows an extensional flow to be generated in the material between the mixing portions makes it possible to actually reliably mix a mixing resistant material having a large viscosity difference between a dispersed phase and a matrix phase therein, thus having completed the present invention.

A continuous mixer according to the present invention thus completed is for continuously mixing a material and comprises: a barrel with a hollow interior; and a pair of mixing rotors which are housed in the barrel and rotate in mutually different directions. Each of the mixing rotors includes a mixing portion with a plurality of mixing flights formed about an axial center of the mixing rotor and projecting radially outward. Both of the mixing rotors are arranged so as to make a center distance therebetween smaller than rotation outer diameters of the respective mixing flights. The mixer has an inter-rotor clearance, which is the smallest clearance between the mixing portions at each rotation phase of the mixing rotors in a cross section perpendicular to axial directions of the both mixing rotors, the inter-rotor clearance satisfying at least one of the following conditions (A) to (C).

(A) The inter-rotor clearance has a size equal to or smaller than 0.16-fold of an inner diameter of the barrel, that is, an inner diameter of a part thereof which part houses one of the mixing rotors, over the rotation region of 85% or more of one rotation of each of the mixing rotors.

(B) The inter-rotor clearance has a size equal to or smaller than 0.1-fold of the inner diameter of the barrel over the rotation region of 59% or more of one rotation of each of the mixing rotors.

(C) The inter-rotor clearance is smaller than 0.07-fold of the inner diameter of the barrel over the rotation region of 34% or more of one rotation of each of the mixing rotors.

On the other hand, a continuous mixing method according to the present invention comprises: preparing a continuous mixer including a barrel with a hollow interior and a pair of mixing rotors which are housed in the barrel and rotate in mutually different directions, each of the mixing rotors including a mixing portion with a plurality of mixing flights formed about an axial center of the mixing rotor and projecting radially outward, the pair of mixing rotors being arranged so as to make a center distance therebetween smaller than a rotation outer diameter of each of the mixing flights; and mixing a material by generating an extensional flow in the material passing through an inter-rotor clearance which is the smallest clearance between the mixing portions at each rotation phase of the mixing rotors in a cross section perpendicular to axial directions of the both mixing rotors.

BRIEF DESCRIPTION OF DRAWINGS

FIG. 2A is a diagram showing a cross-sectional shape of mixing portions in a pair of mixing rotors in a conventional continuous mixer, FIG. 2B is a diagram showing a cross-sectional shape of mixing portions in a pair of mixing rotors in a mixer according to a first example of the invention, and FIG. 2C is a diagram showing a cross-sectional shape of mixing portions in a pair of mixing rotors in a mixer according to a second example of the invention, FIG. 3A is a diagram showing a change in the cross-sectional shape of the mixing portions according to the rotation of the mixing rotors in the conventional continuous mixer and FIG. 3B is a diagram showing a change in the cross-sectional shape of the mixing portions according to the rotation of the mixing rotors in the continuous mixer according to the first example, FIG. 6A is a diagram showing mixing portions of a pair of three-wing mixing rotors, the mixing portions having the same cross-sectional shape, in a continuous mixer according to the invention, and FIG. 6B is a diagram showing mixing portions of a pair of four-wing mixing rotors, the mixing portions having the same cross-sectional shape, in a continuous mixer according to the invention, FIG. 7A is a diagram showing mixing portions of a pair of three-wing mixing rotors, the mixing portions having different cross-sectional shapes, in a continuous mixer according to the invention, and FIG. 7B is a diagram showing mixing portions of a pair of four-wing mixing rotors, the mixing portions having different cross-sectional shapes, in a continuous mixer according to the invention, FIG. 8A is a diagram showing mixing portions of a continuous mixer including mixing rotors in a barrel with a constant inner diameter and FIG. 8B is a diagram showing mixing portions of a continuous mixer including mixing rotors in a barrel, the inner diameter of which is partially increased.

FIG. 13 shows a plurality of examples of mixing rotors having different mixing portion length ratios.

EMBODIMENTS OF INVENTION

Hereinafter, embodiments of a continuous mixer and a mixing method according to the present invention are described in detail with reference to the drawings.

Figure 1:
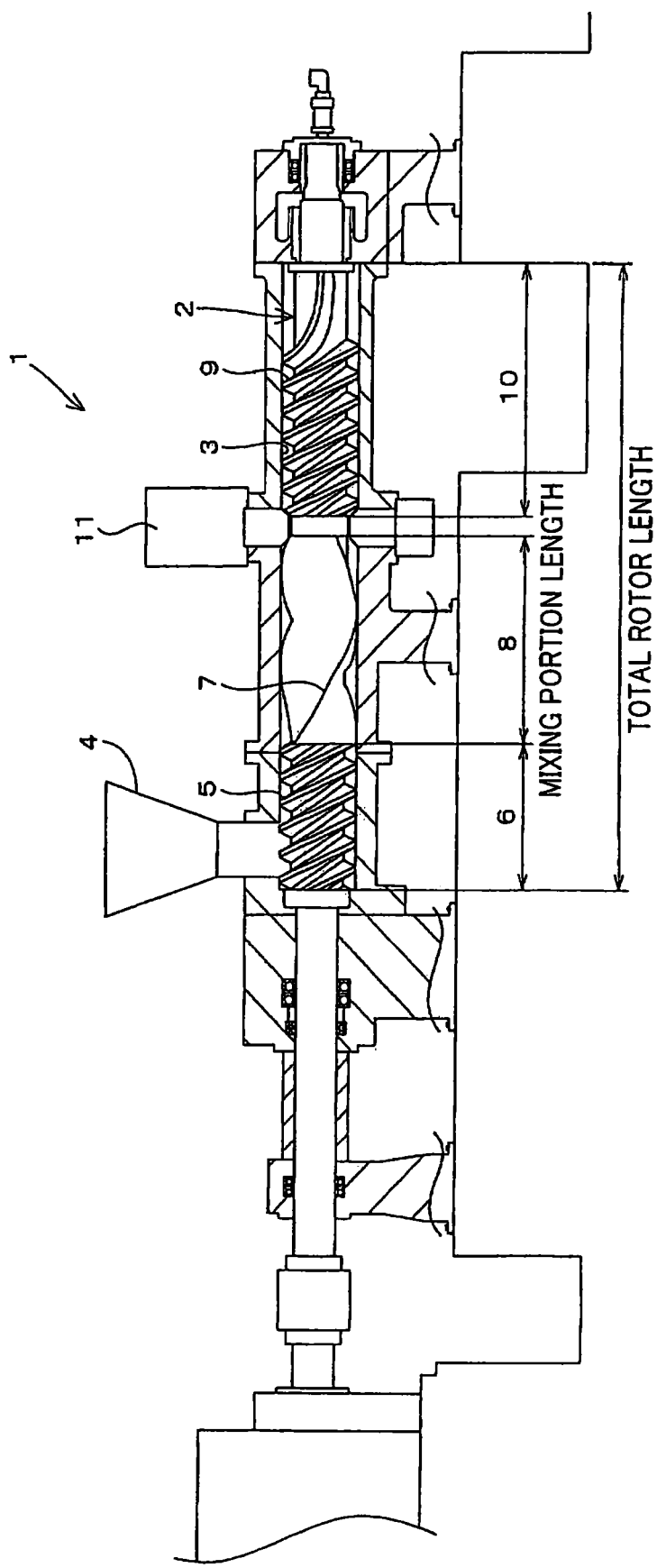
FIG. 1 is a front view in section of a continuous mixer according to a first embodiment of the invention.

FIG. 1 shows a continuous mixer 1 (hereinafter, referred to merely as a mixer 1) according to a first embodiment of the present invention. The continuous mixer according to the present invention includes two mixing rotors which rotate in mutually different directions. The continuous mixer 1 shown FIG. 1 includes a barrel 3 with a hollow interior and a pair of mixing rotors 2, 2 inserted into the barrel 3 along an axial center direction of the barrel 3. In FIG. 1, a left side corresponds to an upstream side of the mixer 1, a right side to a downstream side, and a lateral direction to an axial direction of the mixer 1, respectively.

The barrel 3 is shaped into a tube long in the axial direction of the mixer 1, having a cross section perpendicular to an axial direction of the barrel 3 in which cross section a so-called spectacle-shaped inner peripheral surface made up of two connected arcs is defined, and the hollow is defined inside the inner peripheral surface. A hopper 4 for supplying a material into the barrel 3 is provided at an upstream side in the axial direction of the barrel 3, and an unillustrated discharge port for discharging the material to the outside of the barrel 3 is provided at a downstream side in the axial direction of the barrel 3.

Both of the mixing rotors 2 are inserted into the hollow interior of the barrel 3 as described above and arranged laterally to each other so as to bring the centers of rotation thereof into coincidence with the centers of the left and right arcs defining the inner peripheral surface of the barrel 3, respectively. Each of the mixing rotors 2, 2 has portions protruding outside beyond the opposite ends of the barrel 3 respectively and the respective portions are supported by bearings respectively.

Each of the both mixing rotors 2 includes an outer peripheral portion formed with a plurality of types of flights having different functions. Specifically, each of the mixing rotors 2 includes a feeding portion 6 which is an upstream part in an axial direction thereof, a mixing portion 8 which is an intermediate part in the axial direction and a discharging portion 10 which is a downstream part in the axial direction. The feeding portion 6 includes a screw flight 5 shaped to feed the material supplied from the hopper 4 to the downstream side; the mixing portion 8 includes a plurality of mixing flights 7 shaped to mix the material; the discharging portion 10 includes a screw flight 9 for feeding the material mixed by the mixing portion 8 to the downstream side.

Each of the mixing flights 7 of the mixing portion 8 has a shape of axially extending while being spirally twisted. The mixing portion 8 of this embodiment is so shaped that L/D is 1 or larger when D denotes the diameter thereof and L denotes the length thereof in the axial direction, and includes three mixing flights 7 spiraling about a common axial center.

Each of the mixing flights 7 includes a tip 7a defining a tip clearance (gap) of a predetermined size kept between the tip 7a and the inner peripheral surface of the barrel 3. This tip clearance is set to cause a large shear force to be supplied to the material passing through the tip clearance to thereby allow the material to be mixed with good dispersion. This tip clearance can be set according to a mixing resistant material in a range from 0.01 to 0.1-fold of an inner diameter of the barrel 3, that is, an inner diameter of a part thereof which houses one of the mixing rotors 2.

There is provided, downstream of the mixing portions 8, a mixing degree adjuster 11 (gate portion) which blocks the flow of the material from the upstream side toward the downstream side to thereby enable a mixing degree of the material to be adjusted.

Accordingly, in this mixer 1, mixing the material by the mixing flights 7 at the mixing portions 8 and adjusting the mixing degree of the material in the mixing degree adjuster 11 are performed to mix the material to a desired mixing degree, and the material thus having mixed is fed to the discharging portion 10.

Why it is preferable to set the tip clearances in the above range is as follows. As described above, at the mixing portions 8, shear forces are applied to the material passing through the tip clearances of the predetermined size formed between the tips 7a of the mixing flights 7 and the inner peripheral surface of the barrel 3; however, in the case of a material having a large viscosity difference between a dispersed phase and a matrix phase, the material may not be sufficiently mixed even when large shear forces are applied thereto, if the tip clearances are too small. This is because the shear forces applied to the material are expended to rotate the dispersed phase in the material in a matrix and do not effectively act to disperse the dispersed phase. Besides, the applied shear forces may have been expended on heat generation to rather cause thermal deterioration of the material. Conversely, making the tip clearances too large does not allow sufficient shear forces to be applied to the material, also resulting in insufficiently mixing the material. Therefore, the tip clearances are preferably set in the above range.

On the other hand, as to a composite resin material in which a filler being developed in recent years and having a strong cohesive force is mixed or a mixing resistant polymer alloy, or as to a material including a gel required to be reliably dispersed or destructed, there has been pointed out a problem that a conventional mixing method including only applying shear forces to the material passing through the tip clearances cannot sufficiently mix the material.

In view of this, the continuous mixer 1 includes: such an arrangement of the pair of mixing rotors 2, 2, that a center distance therebetween is shorter than the rotation outer diameter of each of the mixing flights 7, i.e. a diameter of the circle of the locus of a maximum radius point of the mixing flights 7 during its rotation; and setting an inter-rotor clearance CR, that is, the smallest clearance between the mixing portions 8, 8 at each rotation phase of the pair of mixing rotors in a cross section perpendicular to the axial directions of the both mixing rotors 2, 2, to a size which allows an extensional flow to be generated in the material passing through the inter-rotor clearance.

Thus setting the inter-rotor clearance CR enables the material to be mixed so as to be stretched while sandwiched between the both mixing portions 8 and allows an extensional flow (extensional deformation) to be caused in the material to thereby disperse the dispersed phase efficiently in the matrix phase. This results in allowing even a mixing resistant material having a large viscosity difference between a dispersion phase and a matrix phase therein to be reliably mixed.

Next will be described the inter-rotor clearance CR in detail.

As shown in FIG. 2B, the pair of mixing rotors 2, 2 are arranged so that each of the rotation outer diameters of the mixing flights 7 (in general, the diameters of circumscribed circles of the respective mixing flights 7) is larger than the center distance between the mixing rotors 2, 2 and the tips 7a of the mixing flights 7 of one mixing rotor 2 intrude into the inside of the circumscribed circles of the other mixing rotor 2. Specifically, as both of the mixing rotors 2 used are so-called engaging-type mixing rotors having a contact ratio, that is, a ratio of the inner diameter of the barrel 3 to the center distance between the two mixing rotors 2, greater than 1. As an example of a suitable contact ratio of the mixing rotors 2, 2 shown in FIG. 2B, illustrated is 1.2.

Furthermore, in addition to having the above contact ratio, the pair of mixing rotors 2, 2 forms between their respective mixing portions 8, 8 the inter-rotor clearance CR which satisfies any one of the following conditions (1) to (6); these conditions are the results elucidated by the present inventors through experiments.

(1) The inter-rotor clearance CR is smaller than the largest one of clearances formed in directions normal to the inner surface of the barrel between the outer surfaces of the mixing portions 8 and the inner surface of the barrel 3 over the entire area of one rotation of each of the mixing rotors 2. In other words, at whichever angle in a range from 0 to 360° the rotation phases of the pair of mixing rotors 2, 2 are, the inter-rotor clearance CR smaller than the maximum clearance in the direction normal to the inner peripheral surface of the barrel 3 is formed between the mixing portions 8, 8.

(2) The inter-rotor clearance CR is equal to or smaller than 0.16-fold of the inner diameter Db of the barrel 3 over the entire area of one rotation of each of the mixing rotors 2. In other words, at whichever angle in a range from 0 to 360° the rotation phases of the pair of mixing rotors 2, 2 are, the inter-rotor clearance CR having a size equal to or smaller than 0.16-fold of the inner diameter of the barrel 3 (0.16× Db) is formed between the mixing portions 8, 8.

(3) The inter-rotor clearance CR is below 0.16-fold of the inner diameter of the barrel 3 over the rotation region of 85% or more of one rotation of each of the mixing rotors 2. In other words, the inter-rotor clearance CR smaller than 0.16-fold of the inner diameter of the barrel 3 (0.16×Db) is formed between the mixing portions 8, 8 over the rotation region of 306° or larger out of 360°. The region of 306° or larger can be either continuous or discontinuous.

(4) The inter-rotor clearance CR is equal to or smaller than 0.1-fold of the inner diameter of the barrel 3 over the rotation region of 59% or more of one rotation of each of the mixing rotors 2. In other words, the inter-rotor clearance CR equal to or smaller than 0.1-fold of the inner diameter of the barrel 3 (0.1×Db) is formed between the mixing portions 8 over the region of 212° or larger out of 360°. The region of 212° or larger can be either continuous or discontinuous.

(5) The inter-rotor clearance CR is smaller than 0.07-fold of the inner diameter of the barrel 3 over the rotation region of 34% or more of one rotation of each of the mixing rotors 2. In other words, the inter-rotor clearance CR smaller than 0.07-fold of the inner diameter of the barrel 3 (0.07×Db) is formed between the mixing portions 8 over the region of 122° or larger out of 360°. The region of 122° or larger can be either continuous or discontinuous.

(6) The inter-rotor clearance CR is equal to or smaller than 0.07-fold of the inner diameter of the barrel 3 over the entire area of one rotation of each of the mixing rotors 2. In other words, at whichever angle in a range of 0 to 360° the rotation phases of the pair of mixing rotors 2, 2 are, the inter-rotor clearance CR having a size equal to or smaller than 0.07-fold of the inner diameter of the barrel 3 (0.07×Db) is formed between the mixing portions 8, 8.

Next will be described why it is preferable that the inter-rotor clearance CR satisfies the conditions (1) to (6) described above, in comparison to a conventional mixer shown in FIG. 2A. This conventional mixer includes mixing rotors 102, 102 which rotate in mutually different directions, wherein each of the mixing rotors 102, 102 includes a mixing portion 108 formed with a mixing flight 107. FIG. 2A shows a cross-section of the mixing portions 108 perpendicular to axial directions of the mixing portions 108.

As to the mixing portions 108 of the conventional mixer, set is a large center distance (for example, larger than a rotation outer diameter of each of the mixing flights 107) as shown between the mixing rotors 102, 102, in order to avoid interference of the both mixing rotors 102, 102 with a margin. The rotation of the mixing rotors 102 changes the cross-sectional shape of the mixing portions 108 as shown in FIG. 3A, which shows a change in the cross-sectional shape of the mixing portions 108 shown in FIG. 2A at every rotation angle of 15° of the mixing rotors 2.

As shown in FIG. 3A, in the conventional mixer, setting the smallest clearance between the mixing portions 108, 108 at each rotation phase of the both mixing rotors 102, 102 in the cross section perpendicular to axial directions of the mixing rotors 102, 102 is performed in a manner different from that as to the following mixer 1. In this conventional mixer, setting the above large clearance causes the both mixing rotors 102, 102 to continue rotating in mutually different directions involving no engagement of the mixing flights between the both mixing portions 108, 108, thus allowing a material to smoothly pass between the both mixing portions 108, 108; this produces no expectation of generation of an extensional flow (extensional deformation) in the material.

In view of this, considered is a case of setting the center distance between the mixing rotors 102 of the conventional mixer small to make the clearance narrow enough to bring the mixing flights 107 into engagement with each other between the pair of mixing portions 108, 108. While the mixing rotors 102, 102 of the conventional mixer, as shown in FIG. 2A, are given such a large center distance as to prevent a circle indicating a rotation outer diameter of one mixing portion 108 (indicated by dotted line at the left side of FIG. 2A) from overlapping a circle indicating a rotation outer diameter of the other mixing portion 108 (indicated by dotted line at the right side of FIG. 2A), it is assumed that the center distance between the mixing rotors 2, 2 is set small enough to make the above two circles overlap each other. Even in this case, there is remained a possibility of giving no extensional flow (no extensional deformation) to the material depending on the clearance between the mixing portions 108, 108.

On the contrary, in the case of making the center distance small enough to let the smallest clearance (CR) at each rotation phase of the pair of mixing portions 8, 8 smaller than the largest one (CB) of clearances formed in normal directions to the inner surface of the barrel 3 between the outer surfaces of the mixing portions 8 and the inner surface of the barrel 3 over the entire area of one rotation of each of the mixing rotors 2 as shown in FIG. 3B, i.e. as in the above condition (1), a material located in a relatively large clearance can be forced into a relatively small clearance between the pair of mixing portions 8, 8, which allows an extensional flow to be generated. This is the basis for the condition (1).

On the other hand, bases for the conditions (2) to (6) are as follows.

Figure 5:
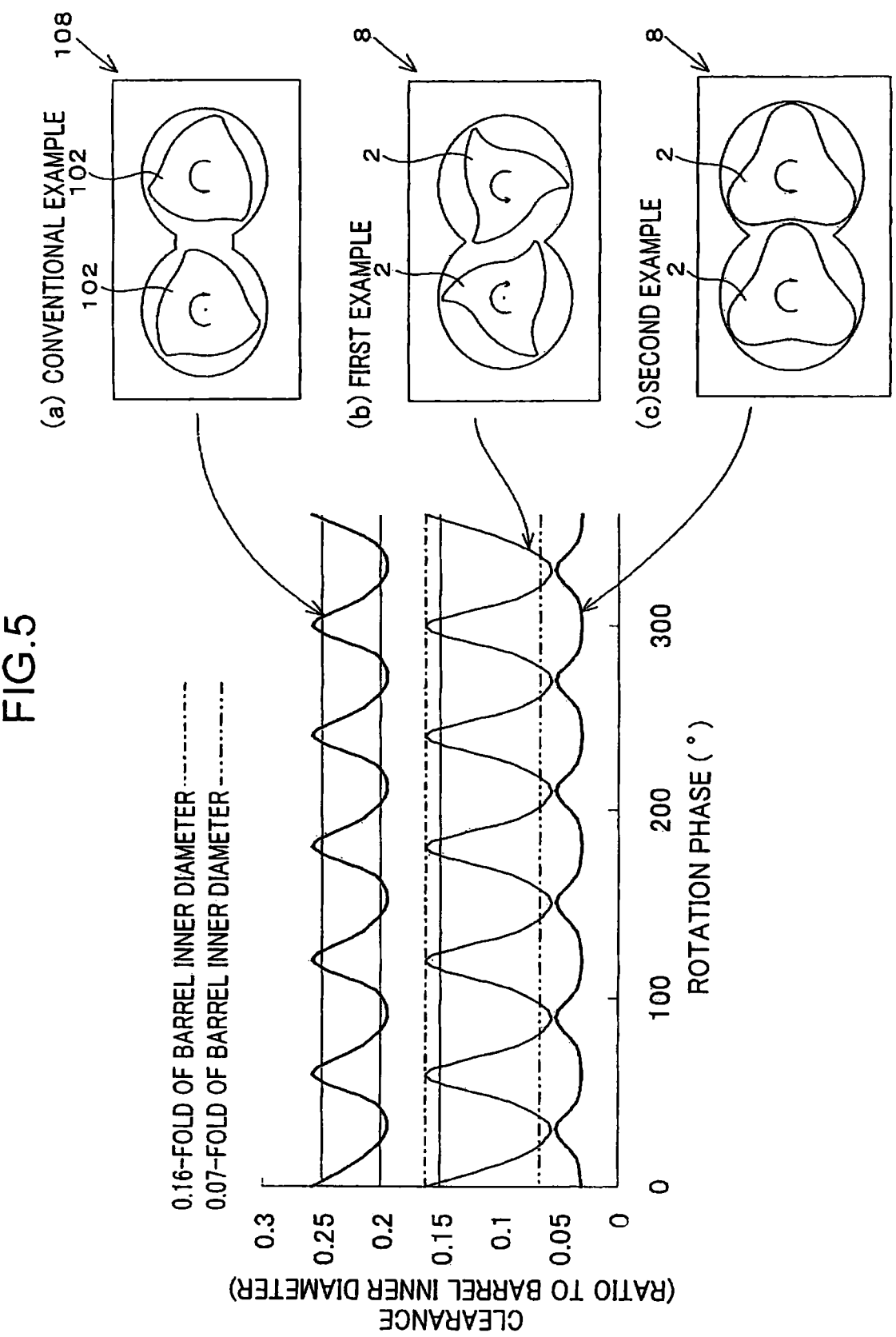
FIG. 5 is a graph and diagrams showing a change in a clearance between the mixing portions according to the rotation of the mixing rotors in the conventional continuous mixer, the continuous mixer according to the first example and the continuous mixer according to the second example.

As shown in FIG. 5, the size of the smallest clearance at each rotation phase formed between the mixing portions 108, 108 of the conventional general non-engaging type mixer varies in a range of 0.19 to 0.27-fold of the inner diameter of the barrel 103 during one rotation of each of the mixing rotors 102 of the mixer. Accordingly, making the center distance between the mixing rotors 102, 102 small enough to let a maximum value of the clearance formed between the mixing portions 108, 108 be 0.16-fold of the inner diameter of the barrel 103 enables a mixer according to a first example as shown in FIG. 2B to be obtained.

The rotation of the mixing rotors 2 of this mixer shown in FIG. 2B changes the cross-sectional shape of the mixing portions 8 as shown in FIG. 3B. In this mixer 1, at a rotation angle θ of the mixing rotors 2 equal to 0° or 60°, the clearance (CB) between the mixing portions 8, 8 is narrower, but slightly, than that of the conventional mixer; however, at θ of about 30°, the clearance (CB) between the mixing portions 8, 8 is notably narrower than that of the conventional mixer. Such a small clearance between the mixing portions 8, 8 improves an action of forcing the material into a gap between the pair of mixing portions 8, 8 and at the same time extending it, thus increasing chances of providing the material with an extensional flow (extensional deformation).

As shown in FIG. 5, the clearance formed between the mixing portions 108, 108 of the conventional mixer is 0.19 to 0.27-fold of the inner diameter Db of the barrel 103; whereas, in the above mixer 1, even the largest clearance formed between the mixing portions 8, 8 is 0.16-fold of the inner diameter Db of the barrel 3. The inter-rotor clearance CR capable of generating a sufficient extensional flow is obviously smaller than the maximum value of the clearance which is 0.16-fold of the inner diameter of the barrel 3; therefore, the inter-rotor clearance CR, if having a size equal to or smaller than the 0.16-fold of the inner diameter of the barrel 3 over the entire area of one rotation of each of the mixing rotors 2 as in the above condition (2), is able to increase chances of generating an extensional flow in the material.

On the other hand, as shown in FIG. 3B, the minimum clearance formed between the pair of mixing portions 8, 8 is not continually small, but variable in size according to the rotation of the mixing rotors 2 in the mixer 1. Such an inter-rotor clearance CR as allows a sufficient extensional flow to be generated in the material is a small one of the clearances possible to be formed between the mixing portions 8, 8. For example, in a graph of FIG. 5, where the clearance formed between the mixing rotors 2, 2 is below 0.16-fold of the inner diameter of the barrel 3 is over the rotation region of 85% or more of one rotation of each of the mixing rotors 2. Hence, if the inter-rotor clearance CR is formed so as to be smaller than the 0.16-fold of the inner diameter Db of the barrel 3 over the rotation of 85% or more of one rotation as in the condition (3), the mixer 1 shown in FIG. 2B can obtain a high effect of generating the extensional flow.

Similarly to the condition (3), the condition (4) is derived by focusing on the rotation region in which the inter-rotor clearance CR has a size equal to or smaller than 0.1-fold of the inner diameter Db of the barrel 3, and the condition (5) is derived by focusing on the rotation region in which the inter-rotor clearance CR has a size smaller than 0.07-fold of the inner diameter Db of the barrel 3. Besides, the condition (6) is derived by focusing that the minimum value of the clearances of the first example is equal to or smaller than 0.07-fold of the inner diameter of the barrel 3 in the entire area (0 to 360°) of the mixing rotors 2 in the graph of FIG. 5.

While any of the conditions (1) to (6) specifies the upper limit value of the inter-rotor clearance CR but no lower limit value, an excessively small inter-rotor clearance CR may hinder the material from passing between the mixing portions 8, 8 to also lower mixing performance of the mixer 1. In view of this point, it is preferable that the inter-rotor clearance CR has a size equal to or larger than 0.02-fold of the inner diameter Db of the barrel 3, as a condition (7).

Besides, if the inter-rotor clearance CR is smaller than the tip clearances (that is, clearances between the tips 7a of the mixing flights 7 and the inner peripheral surface of the barrel 3), a larger amount of the material is allowed to pass through the tip clearances while the amount of the material passing through the inter-rotor clearance CR is suppressed. Therefore, to enhance an effect of imparting extensional deformation to the material, it is preferable to make the inter-rotor clearance CR larger than the tip clearances over the entire area of one rotation of each of the mixing rotors 2. For example, in the case of the inter-rotor clearance CR having a size equal to 0.07-fold of the inner diameter Db of the barrel 3, the tip clearances preferably have a size equal to or smaller than 0.07-fold of the inner diameter Db of the barrel 3. Conversely, to enhance an effect of shearing the material, it is preferable to make a relationship between the size of the inter-rotor clearance CR and those of the tip clearances be the reverse of the relationship in the case of an adjustment to enhance the effect of imparting extensional deformation to the material.

FIG. 2C illustrates a mixer 1 capable of keeping such a small inter-rotor clearance CR as is specified by the conditions (1) to (6) over a wide rotation region. This mixer 1 includes mixing portions 8 each having a plurality of mixing flights 7 with a cross-sectional shape more rounded than that of the mixers shown in FIGS. 2A and 2B, the mixing flights 7 located at equal intervals, specifically at intervals of 120°, about an axial center of each of the mixing portions 8. Recesses 12 are formed between the mixing flights 7, 7 adjacent to each other in a circumferential direction, respectively. Each of the respective recesses 12 is a part where the outer peripheral surface of one mixing portion 8 is indented so as to receive the leading ends (tips 7a) of the mixing flights 7 of the other mixing portion 8 opposed to the one mixing portion 8, having a cross-sectional shape including an outer peripheral surface hollowed toward the axial center beyond tangents connecting the outer peripheral surfaces of the mixing flights 7 adjacent to each other in the circumferential direction. This arrangement of the both mixing portions 8 thus opposed to each other so as to proximate the tip 7a at the leading end of the mixing flight 7 of the other mixing portion 8 to the recess 12 of the one mixing portion 8, for example, as shown in the following FIGS. 6 to 8, makes it possible to keep the inter-rotor clearance CR small and reduce a variation in the inter-rotor clearance CR.

Figure 4A:
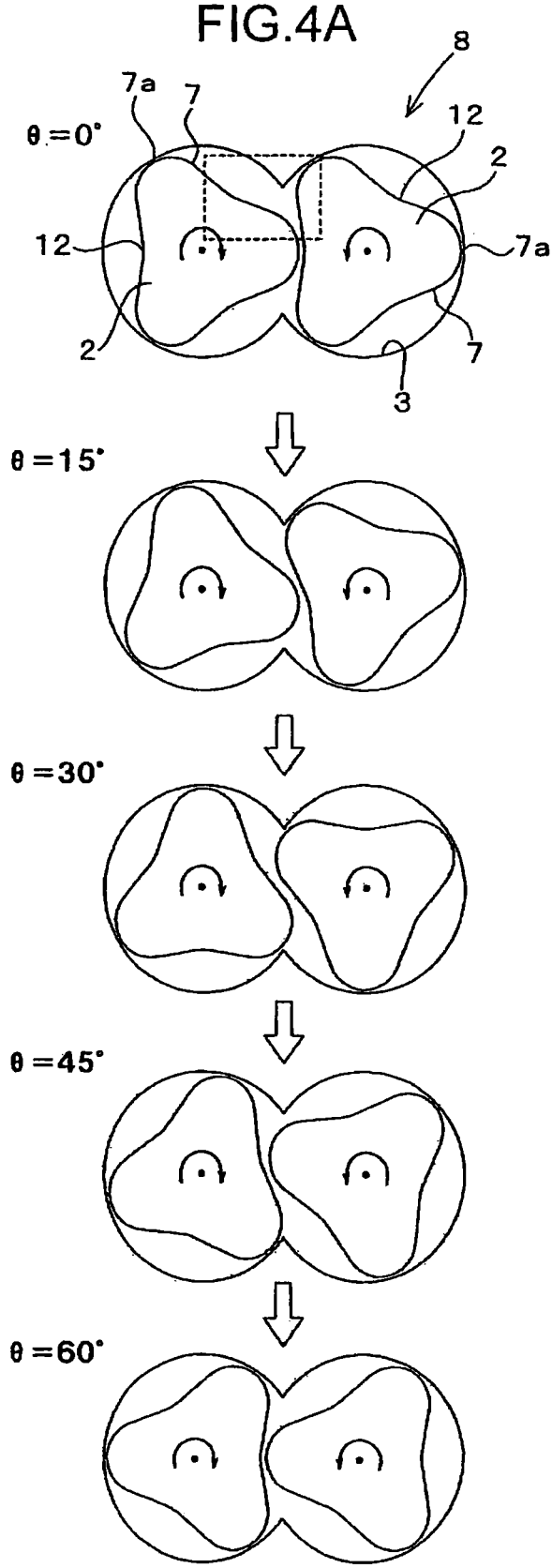
FIG. 4A is a diagram showing a change in the cross-sectional shape of the mixing portions according to the rotation of the mixing rotors in the continuous mixer according to the second example.

FIG. 4A shows a change in the cross-sectional shape of the mixing portions 8 according to the rotation of the mixing rotors 2 shown in FIG. 2C at every rotation angle of 15°. FIG. 4A shows that a variation of the clearance formed between the mixing rotors 2, 2 of the mixer 1 of a second example shown in FIG. 2C is small, over the entire area (rotation phase of 0° to 360°) of the mixing rotors 2, as compared with the conventional mixer shown in FIG. 3A and the mixer of the first example shown in FIG. 3B. Moreover, the clearance that is small as compared with the conventional mixer shown in FIG. 3A and the mixer of the first example shown in FIG. 3B is maintained all over the rotation region.

Figure 4B:
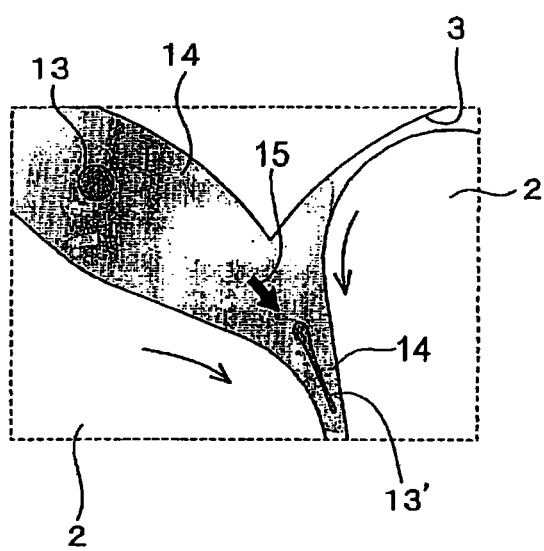
FIG. 4B is a diagram showing a mixed state of a material between the mixing portions shown in FIG. 4A.

The graph of FIG. 5 indicates that, in the mixer of the second example shown in FIG. 2C, the smallest clearance formed between the mixing portions 8, 8 at each rotation phase keeps its size of 0.03 to 0.06-fold of the inner diameter of the barrel 3 during one rotation of each of the mixing rotors 2. This mixer 1 thus forces a material introduced into the inter-rotor clearance CR between the mixing portions 8, 8 as shown in FIG. 4B into a gap between the outer peripheral surfaces of the both mixing portions 8 moving in the same direction and extends the material in a direction of arrow in FIG. 4B to impart an extensional deformation thereto. This extensional deformation is constantly imparted during one rotation of each of the mixing rotors, which results in applying a force of the extensional deformation more than sufficiently to a dispersed phase 13 not having been extensionally deformed yet (cross-hatched part in FIG. 4B) included in the material to thereby produce a dispersed phase 13' which has been extensionally deformed. In short, the dispersed phase 13 is dispersed in a matrix phase 14 with good dispersibility; thus, even the material having a great viscosity difference between the dispersed phase 13 and the matrix phase 14 can be reliably mixed.

The mixer including such an inter-rotor clearance CR as satisfies the conditions (1) to (6) is not limited to the one shown in FIG. 2C. Another example is shown in FIG. 6B. FIG. 6B shows a mixer 1 which includes a pair of mixing portions 8, 8 adjacent to each other in a radial direction similarly to the mixer shown in FIG. 2C, the mixing portions 8, 8 having the same shape in a cross section perpendicular to axial directions of the mixing portions 8, 8; however, while the mixer shown in FIG. 2C is a three-wing type in which the number of either the mixing portions 8 or the recesses 12 is three, the mixer shown in FIG. 6B is a four-wing type in which the number of either the mixing portions 8 or the recesses 12 is four. Specifically, the mixer 1 shown in FIG. 6B includes four mixing flights 7 and four recesses 12 each provided at equal intervals, i.e. at intervals of 90° about an axial center of each of the mixing portions 8, while both of the mixing portions 8 are provided so as to make the recesses 12 of one mixing portion 8 and tips 7a at the leading ends of the mixing flights 7 of the other mixing portion 8 be proximately opposed to each other respectively. Note that the disclosure of the clearances is omitted in FIGS. 6A and 6B.

Furthermore, the mixer including such an inter-rotor clearance CR as satisfies the conditions (1) to (6) is not limited to the one whose mixing portions 8, 8 have same cross-sectional shapes.

FIG. 7A shows a mixer 1 which includes mixing portions 8 each formed with three mixing flights 7 and three recesses 12 alternately arranged at equal intervals of 120° about an axial center similarly to one shown in FIG. 6A, but the mixing flights 7 of one mixing portion 8 have shapes totally different from those of the other mixing portion 8. Specifically, the mixing flights 7 of the one mixing portion 8 form a cross-section where each of the mixing flights 7 projects in substantially semicircular shapes toward the inner peripheral surface of the barrel 3, more specifically, a cross-section including three ellipses placed at equal intervals on the outer periphery (outer edge) of one large circle and being smaller than the large circle, whereas, the mixing flights 7 of the other mixing portion 8 have a somewhat more angular cross-sectional shape than those shown in FIG. 6A, respectively. The mixing portions 8, 8 having mutually different cross-sectional shapes can keep an inter-rotor clearance CR between the mixing portions 8, 8 substantially constant or constant during one rotation of each rotor 2.

FIG. 7B shows mixing portions 8 each of which includes mixing flights 7 and recesses 12 having respective shapes corresponding to that of the mixing flights 7 and the recesses 12 of the mixing portions 8 shown in FIG. 7A, respectively, but the number of either the mixing flights 7 or the recesses 12 is four. In short, each of the mixing portions 8 shown in FIG. 7B is four-wing type, but similarly to the mixing portions 8 shown in FIG. 7A, the cross-sectional shape of one mixing portion 8 is totally different from that of the other mixing portion 8. Also in FIGS. 7A and 7B, the disclosure of the clearances is omitted.

The mixer 1 including the mixing portions 8 shown in each of above-mentioned FIGS. 6A and 6B and FIGS. 7A and 7B also can form an inter-rotor clearance CR satisfying the conditions (1) to (6) between the pair of mixing portions 8, 8, thereby reliably mixing even a material having a large viscosity difference between a dispersed phase 13 and a matrix phase 14 therein.

In the present invention, the inner diameter Db of the barrel 3 can be changed in the circumference direction while satisfying the conditions (1) to (6). FIG. 8A shows an example of a mixer 1 where one mixing portion 8 has a cross-sectional shape mutually different from that of the other mixing portion 8. FIG. 8B shows one different from the mixing portions 8 of FIG. 8A in that the opposite outer parts of the inner peripheral surface of the barrel 3 most distant from each other are radially outwardly enlarged (i.e. the inner diameter of the barrel 3 at these parts is larger than at the other parts). In other words, FIG. 8B shows one having the inner diameter Db of the barrel 3 locally enlarged at the mixing portions 8 and tip clearances, wherein the tip clearance is larger in a specific position than in the other position in the circumferential direction. Thus locally enlarged tip clearance has an advantage of suppressing heat generation of the mixed material.

EXAMPLES

The conventional example, the first example and the second example respectively shown in FIGS. 2A, 2B and 2C are described in more detail below.

First, the conventional mixer shown in FIG. 2A includes the barrel 103 having an inner diameter Db of 50 mm and a pair of mixing rotors 102 to be inserted into this barrel 103, the mixing rotors 102 being arranged so as to make the center distance therebetween be 50 mm. Each of the mixing rotors 102 includes an intermediate part in the axial direction which constitutes the mixing portion 108. Each of the mixing portions 108 includes three mixing flights 107 formed about the axial center of the mixing portion 108, and the inter-rotor clearance CR is formed between the both mixing portions 108, 108. In this conventional mixer, the mixing rotors 102 rotate in mutually different directions and the inter-rotor clearance CR varies within the range of 0.19 to 0.26-fold of the inner diameter of the barrel 103 during one rotation of each of the mixing rotors 102.

On the other hand, the mixer 1 of the first example shown in FIG. 2B includes the barrel 3 having an inner diameter Db of 62 mm and a pair of mixing rotors 2 to be inserted into this barrel 3, the mixing rotors 2 being arranged so as to make the center distance therebetween be 50 mm. Each of the mixing rotors 2 includes an intermediate part in the axial direction which constitutes the mixing portion 8. Each of the mixing portions 8 includes three mixing flights 7 formed about the axial center of the mixing portion 8, forming the inter-rotor clearance CR between the mixing portions 8, 8. In this mixer of the first example, the both mixing rotors 2 rotate in mutually different directions, and the inter-rotor clearance CR varies within the range of 0.06 to 0.16-fold of the inner diameter of the barrel 3 during one rotation of each of the mixing rotors 2.

The mixer 1 of the second example shown in FIG. 2C includes the barrel 3 having an inner diameter Db of 62 mm and a pair of mixing rotors 2 to be inserted into this barrel 3, the mixing rotors 2 being arranged so as to let the center distance therebetween be 50 mm. Each of the mixing rotors 2 includes an intermediate part in the axial direction which constitutes the mixing portion 8. Each of the mixing portions 8 includes three mixing flights 7 formed about the axial center of the mixing portion 8, and the inter-rotor clearance CR is formed between the both mixing portions 8, 8. The mixing flights 7 according to this second example have respective cross-sectional shapes more rounded than those according to the conventional example and the first example, and forms the recesses indented to receive the leading ends of the mixing flights 7 between the mixing flights 7, 7 adjacent to each other in the circumferential direction. In this mixer of the second example, both of the mixing rotors 2 rotate in mutually different directions and the inter-rotor clearance CR varies within the range of 0.03 to 0.06-fold of the inner diameter of the barrel 3 during one rotation of each of the mixing rotors 2.

The inter-rotor clearance CR of the mixer 1 of the first example satisfies the condition (1) and the conditions (2) to (5) and the inter-rotor clearance CR of the mixer 1 of the second example satisfies the conditions (1) to (6).

Figure 9:
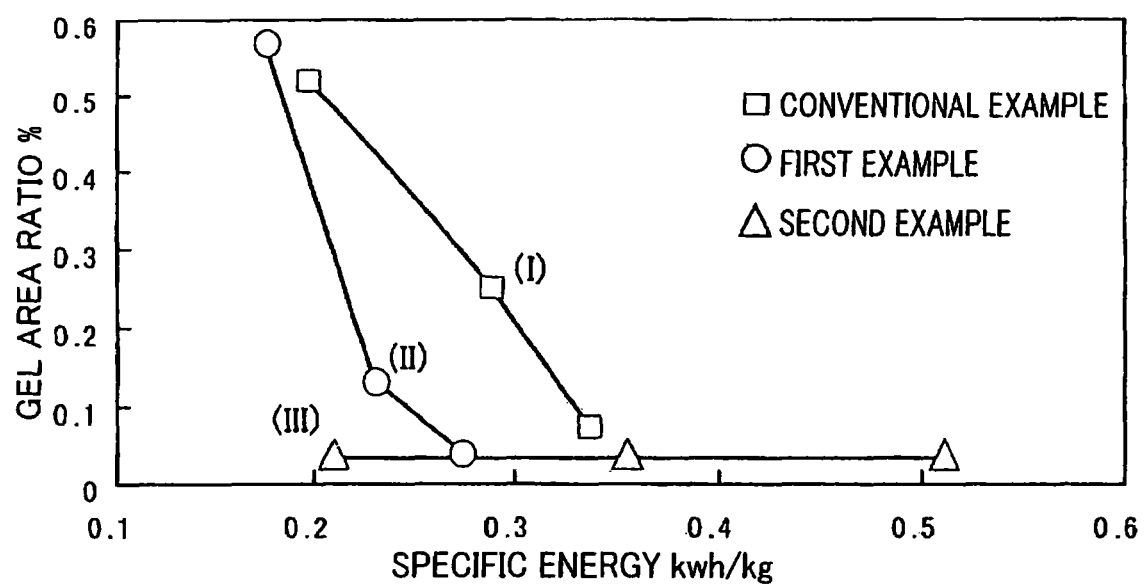
FIG. 9 is a graph showing a relation between an SEI value (specific energy) and a gel area ratio (ratio of a gel formation area to a microscope observation area) in the conventional example, the first example and the second example, FIG. 10 are microscope observation pictures of materials mixed in the conventional example, the first example and the second example.
Figure 10A:
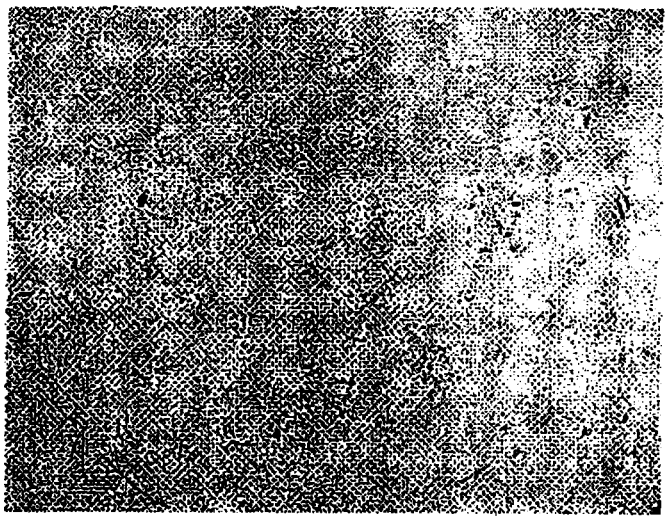
Figure 10B:
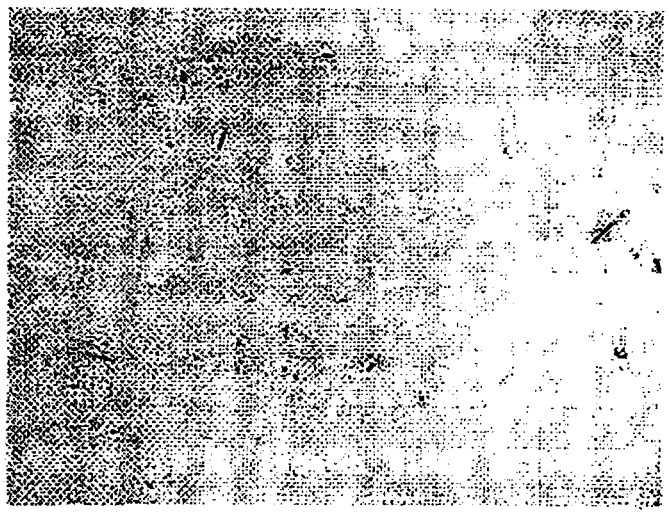
Figure 10C:
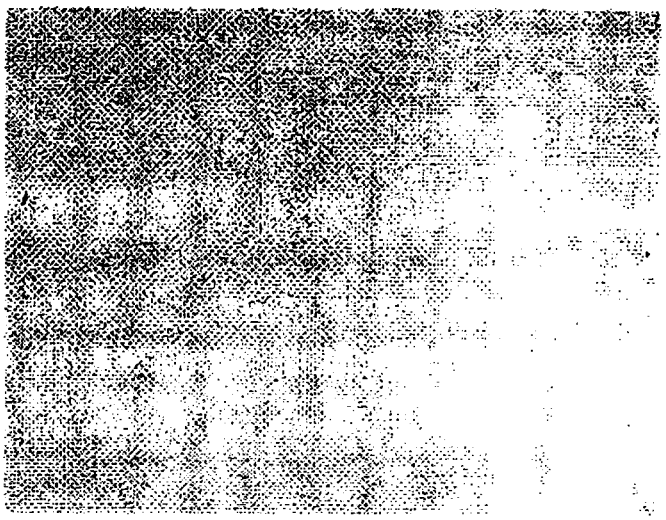

Next will be described a result of the measurement on how much gel was confirmed in the materials mixed by the respective mixers according to the above first and second examples and conventional example. The materials to be mixed were mixed powders of polyethylene and carbon; FIG. 9 shows a result of mixing these materials by use of the mixing rotors rotating at 440 rpm in the barrel. The confirmation of the gel in the material was performed by observing a ratio of the area of black parts indicating the gel (parts where carbon is not mixed) to an observation view area (1495 μm×1128 μm), the ratio, here, called as a "gel area ratio" (%). FIG. 9 shows a relationship between the gel area ratio and specific energy required for mixing, which relationship was measured by changing mixing energy applied to the material. FIGS. 10A, 10B and 10C are microscope observation pictures of the materials mixed in the conventional example, the first example and the second example, respectively, each of the pictures being black-and-white highlighted to make a state of the gel more visible.

In the graph of FIG. 9, the leftmost plot point of the conventional example (□) indicates that the gel area ratio when the specific energy is 0.197 kwh/kg is 0.52%. On the other hand, the leftmost plot point of the first example (○) indicates that the gel area ratio when the specific energy is 0.174 kwh/kg is 0.57%, which ratio is higher than the gel area ratio when the specific energy is 0.197 kwh/kg in the conventional example (0.52%). However, in a comparison at the same specific energy (0.2 kwh/kg), the gel area ratio in the first example is below 0.4%, which ratio is lower than that in the conventional example, 0.57%. Furthermore, the leftmost plot point of the second example (Δ) indicates that the gel area ratio when the specific energy is 0.21 kwh/kg, which is the same level of the leftmost plot point of the conventional example, is 0.04% which is considerably lower than that of the conventional example. These results indicate a clear difference in the gel area ratio between the conventional example and the first and second examples even when the specific energy (mixing energy) applied to the material is about the same.

Besides, the results at the second and third plot points from the left indicate that: the gel area ratios when the specific energy is 0.287 kwh/kg and 0.336 kwh/kg in the conventional example (□) are 0.26% and 0.07%, respectively; the gel area ratios when the specific energy is 0.229 kwh/kg and 0.273 kwh/kg in the first example (○) are 0.13% and 0.04%, respectively; and the gel area ratios when the specific energy is 0.355 kwh/kg and 0.511 kwh/kg in the second example (Δ) are 0.035% and 0.03%, respectively. In any case, the gel area ratio decreases as the specific energy (mixing energy) increases.

The above results teach that the mixing portions 8 of the first example including the inter-rotor clearance satisfying the conditions (1) and the conditions (2) to (5) can apply mixing energy to the material more efficiently and mix the material with more dispersibility than the mixing portions 108 of the conventional example. Moreover, the comparison of the first and second examples makes it understood that the mixing portions 8 of the second example including the inter-rotor clearance CR satisfying the condition (6) in addition to the condition (1) can mix the material with good dispersibility with less mixing energy than the mixing portions 8 of the first example.

The respective microscope observation pictures shown in FIGS. 10A, 10B and 10C are the one taken when the material was mixed on the condition (specific energy) at the second plot point from the left of FIG. 9 in the conventional example (□), the one taken when the material was mixed on the condition (specific energy) at the second plot point from the left of FIG. 9 in the first example (○) and the one taken when the material was mixed on the condition (specific energy) at the leftmost plot point of FIG. 9 in the second example (Δ), respectively. The comparison of these pictures make it understood that the gel (black points in the pictures) in the material can be drastically reduced with less energy in the first example than in the conventional example and with less energy in the second example than in the first example: i.e. that the first and second examples display a high effect of eliminating the gel with less energy.

Besides, the comparison of the first and second examples on the specific energy (mixing energy) required to mix the material to such an extent that the gel can be hardly confirmed (gel area ratio is below 0.1%) allows to know that the specific energy required in the first example is more than that in the second example, i.e. that the material can be mixed up to a gel-free state with less energy in the second example than in the first example.

Next will be explained a second embodiment according to the present invention.

The second embodiment presents a mixer which satisfies the following condition (8) on the inter-rotor clearance, in addition to the above-mentioned condition (1).

Condition (8): The inter-rotor clearance CR is equal to or smaller than 0.18-fold of the inner diameter of the barrel 3 over the rotation region of 85% or more of one rotation of each of the mixing rotors 2. In other words, the inter-rotor clearance CR equal to or smaller than 0.18-fold of the inner diameter of the barrel 3 (0.18×Db) is formed between the mixing portions 8, 8 over the rotation region of 306° or larger out of 360°. The region of 306° or larger can be either continuous or discontinuous.

The basis of the condition (8) will be explained in comparison with the inter-rotor clearance formed in the conventional mixer.

Figure 11:
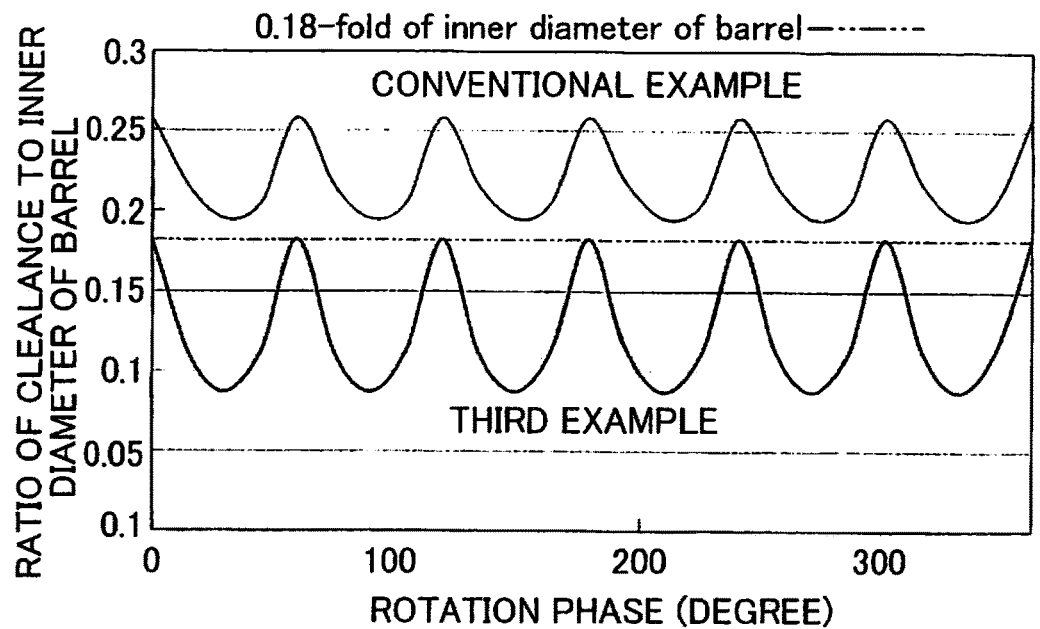
FIG. 11 is a graph showing a relation between a rotation phase of mixing rotors and a clearance between mixing rotors in each of mixers according to a third example and a conventional example.

FIG. 11 shows respective inter-rotor clearances according to the conventional example and a third example. The inter-rotor clearance according to the "conventional example" is a clearance formed between the mixing portions 108 and 108 of the conventional mixer as shown in FIG. 5. The clearance of the "conventional example" varies in a range of 0.19-fold to 0.27-fold of the inner diameter of the barrel 103. Although the mixing by the "conventional example" cannot be expected to generate an extensional flow or an extensional deformation in the material, decreasing the clearance between the mixing portions and increasing a frequency of generation of a small clearance enables the effect of generating the extensional flow in the material to be obtained.

On the other hand, in the mixer 1 according to the "third mixer" capable of generating the extensional flow in the material, the rotation of each of the mixing rotors 2 allows a clearance varying in a range from 0.08 to 0.18 fold of the inner diameter of the barrel to be formed between the mixing rotors 2 and 2. Such a small clearance is able to be an inter-rotor clearance CR effective for the generation of the extensional flow.

According to the third example shown in FIG. 11, the clearance is equal to or smaller than 0.18-fold of the inner diameter of the barrel 3 (below the chain double-dashed line in FIG. 11) in almost 100% of a rotation region. The clearance that satisfies the above condition (8), therefore, effects a generation of the extensional flow in the material.

The inventors of the present invention has recognized that the inter-rotor clearance CR equal to or smaller than 0.18-fold of the inner diameter of the barrel 3 over the rotation region of 85% or more of one rotation of each of the mixing rotors enables an extensional flow to be surely generated in a material.

Figure 12:
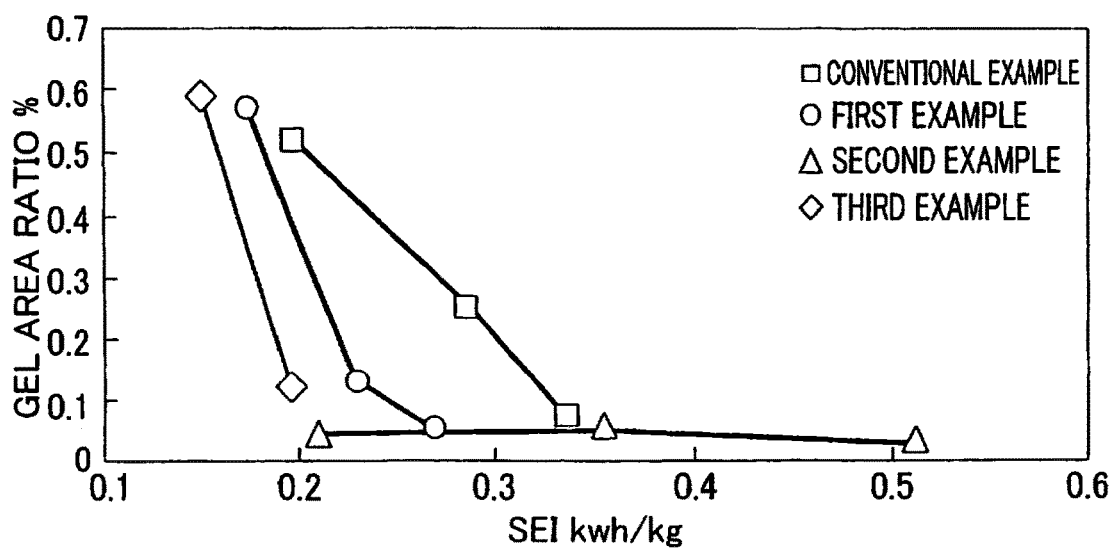
FIG. 12 is a graph showing a relation between an SEI value (specific energy) and a gel area ratio (ratio of a gel formation area to a microscope observation area) in the third example.

FIG. 12 shows a tendency of the gel area ratio in the material mixed by the mixer 1 according to the third example to change in relation to the specific energy, which tendency is obtained similarly to the first and second examples. On the specific energy in the neighborhood of 0.2 kwh/kg in FIG. 12, the gel area ratio corresponding to the neighborhood of 0.2 kwh/kg in the conventional example (□) has a great value equal to or greater than 0.5% whereas the gel area ration corresponding to the neighborhood of 0.2 kwh/kg in the third example (◊) is lowered to the value of about 0.1%; this indicates that also the third example enables the material to be mixed with good dispersion with low mixing energy. Accordingly, forming the inter-rotor clearance CR equal to or smaller than 0.18-fold of the inner diameter Db of the barrel 3 over the region of 85% or more like the above-mentioned condition (8) makes it possible to obtain the effect of generating the extensional flow in the material compared to the conventional example.

Next will be a third embodiment according to the present invention.

The third embodiment presents a mixer which comprises a mixing rotor satisfying the follow condition (9) on an axial length thereof.

Condition (9): Each of the mixing rotors 2 includes, as the mixing portion 8, at least one mixing portion having a diameter D and an axial length L which make a ratio L/D (hereafter, it is called a mixing portion length ratio) be 1 or larger. Furthermore, each of the mixing rotors 2 has a mixing portion length ratio Ln/L1 which satisfies a condition of $0.30 \leq Ln/L1 \leq 0.53$, wherein Ln denotes an axial length of the mixing portion 8 when each of the mixing rotors 2 has the mixing portion 8 in only a single area or denotes a total sum of axial lengths of all of the mixing portions 8 when each of the mixing rotor 2 has the mixing portion 8 in each of a plurality of areas spaced in the axial direction (hereafter, Ln is called a total mixing portion length) and L1 denotes an axial length of the portion except supported shaft portions, that is, the portion contributing to mixing or feeding a material, in the mixing rotor 2 (hereafter, it is called a total rotor length).

Next will be explained how the performance of mixing of material, especially performance of reducing gel, changes when the total sum of the axial length of the mixing portion 8 satisfies the above-mentioned relation, in comparison with the mixing by the conventional mixer.

The mixing portion length ratio can be modified by a change of the length or the number of the mixing portion 8. The following TABLE 1 and FIG. 13 show a plurality of examples K1 to K9 of the mixing rotors 2 which satisfy the above condition (9). In the mixing rotors 2, there is formed a first mixing portion and/or a second mixing portion, each of which portions is a gray part in FIG. 13, by a combination of a material feeding type of rotor segment (given a line inclined downwardly from left to right in FIG. 13) which feeds a material downstream and a material backing type of rotor segment (given a line inclined downwardly from right to left in FIG. 13) which backs up a material upstream.

TABLE 1

| | RATIO OF FIRST MIXING PORTION LENGTH TO TOTAL ROTOR LENGTH | RATIO OF SECOND MIXING PORTION LENGTH TO TOTAL ROTOR LENGTH | RATIO OF TOTAL MIXING PORTION LENGTH TO TOTAL ROTOR LENGTH |
|---|---|---|---|
| K1 | 0.35 | 0.18 | 0.53 |
| K2 | 0.35 | 0.00 | 0.35 |

TABLE 1-continued

| | RATIO OF FIRST MIXING PORTION LENGTH TO TOTAL ROTOR LENGTH | RATIO OF SECOND MIXING PORTION LENGTH TO TOTAL ROTOR LENGTH | RATIO OF TOTAL MIXING PORTION LENGTH TO TOTAL ROTOR LENGTH |
|---|---|---|---|
| K3 | 0.26 | 0.18 | 0.44 |
| K4 | 0.22 | 0.18 | 0.40 |
| K5 | 0.26 | 0.14 | 0.40 |
| K6 | 0.26 | 0.09 | 0.35 |
| K7 | 0.26 | 0.09 | 0.35 |
| K8 | 0.26 | 0.18 | 0.44 |
| K9 | 0.26 | 0.04 | 0.30 |
| E1 | 0.28 | 0.17 | 0.45 |

The mixing rotor 2 of K1 has a first mixing portion 81 and a second mixing portion 82 provided downstream of the first mixing portion 81. Each of the mixing portions 81 and 82 has a combination of the material feeding type of rotor segment and the material backing type of rotor segment. The total mixing portion length, that is, the total sum of the axial lengths of the mixing portions 81 and 82 makes up 53% of the total rotor length.

The mixing rotor 2 of K2 has a first mixing portion 81 which has the same axial length and is provided at the same position as K1, but lacks a second mixing portion 82.

Each of the mixing rotors 2 of K3 and K4 has a first mixing portion 81 and a second mixing portion 82 having the above combination of the two types of rotor segments similarly to K1, but the second mixing portion 82 of K3 has an axial length shorter than that of K1 and the second mixing portion 82 of K4 has an axial length shorter than that of K3.

Each of the mixing rotors 2 of K5 to K7 has a first mixing portion 81 and a second mixing portion 82 and each of the first mixing portions 81 thereof is the same as that of K1, whereas each of the second mixing portions 82 is different from that of K1. Specifically, the second mixing portion 82 of K5 has only a material feeding type of rotor segment. The second mixing portion 82 of K6 has only a material backing type of rotor segment. The second mixing portion 82 of K7, though having both a material backing type and a material backing type of rotor segments, has an axial length shorter than that of the second mixing portion 82 of K3.

The mixing rotor 2 of K8 has a first mixing portion 81 and a second mixing portion 82, each of the first and second mixing portions 81 and 82 having both two types of rotor segments similarly to K1; however, the two rotor segments of the first mixing portion 81 of K8 are arranged so as to circumferentially offset respective ends of making flights 7 of the two rotor segments, while, in each of the mixing portions 81 of K1 to K7, the two segments are so arranged so as to make continuous respective ends of the making flights 7 of the two rotor segments.

The mixing rotor 2 of K9 has a first mixing portion 81 which is the same as that of K7 and a second mixing portion 82; however, the second mixing portion 82 of K9 lacks a material backing type of rotor segment and thus the total mixing portion length of the mixing rotor 2 of K9 makes up 30% of the total rotor length thereof.

Figure 14:
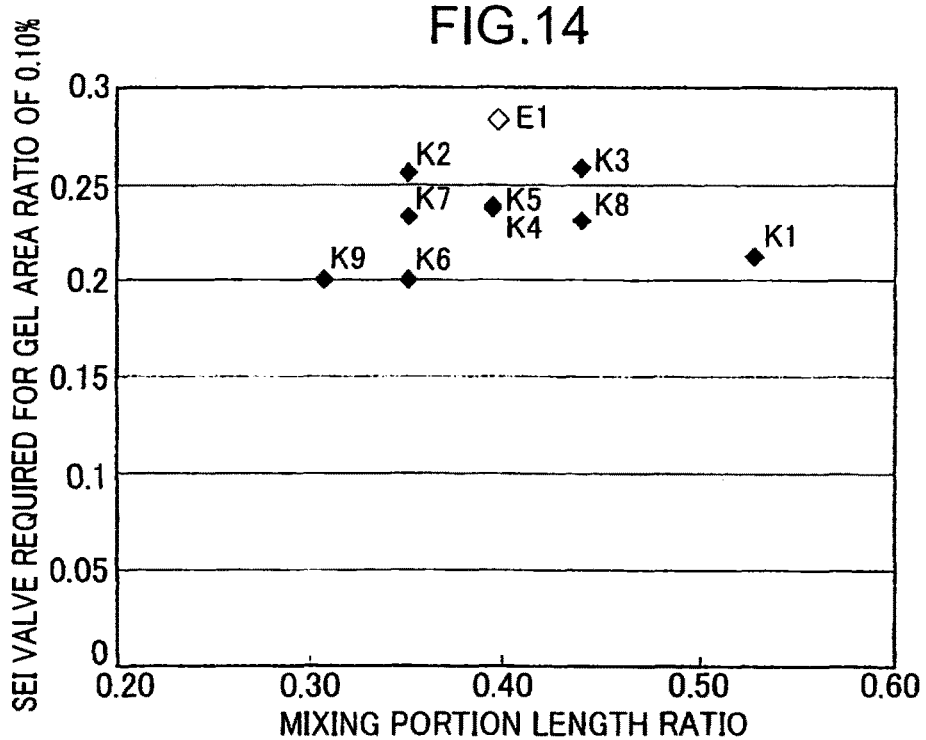
FIG. 14 is a graph showing a relation between a mixing portion length ratio and an SEI value required for obtaining a gel area ratio of 0.10%.
Figure 15:
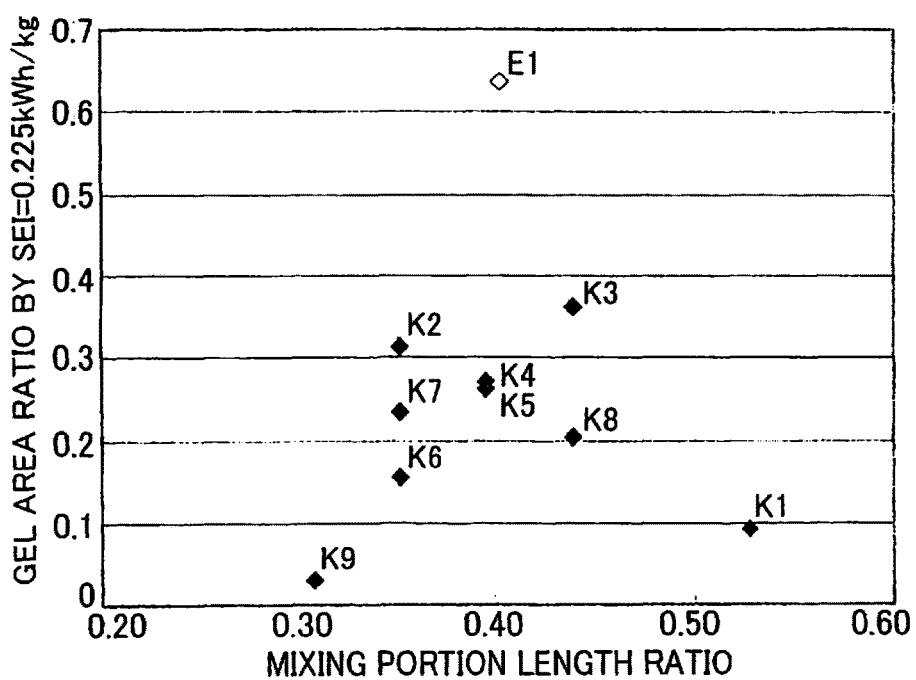
FIG. 15 is a graph showing a relation between a mixing portion length ratio and a gel area ratio corresponding to an SEI value of 0.225 kWh/kg.

As shown in FIGS. 14 and 15, all of the mixing rotors 2 of K1 to K9, though having different shapes or structures, are able to generate an extensional flow in material because of their respective inter-rotor clearances CR satisfying the conditions (1) to (8).

FIG. 14 shows a relation between a mixing portion length ratio and an SEI value required for obtaining the gel area ratio of 0.10%. FIG. 14 teaches that each of the mixing rotors 2 of K1 to K9, which have the mixing portion length ratios distributed in a wide range of 0.30-0.53, requires only an SEI of 0.2-0.26 kWh/kg for obtaining the gel area ratio of 0.10%; the SEI is obviously smaller than that which a mixing rotor 102 of an example E1 shown in FIG. 13 requires, that is, 0.28 kWh/kg. This indicates that all of the mixing rotors 2 of K1 to K9 are capable of generating an extensional flow to reduce gel in a material more efficiently than E1.

FIG. 15 shows a relation between a mixing portion length ratio in a range of 0.30-0.53 and a gel area ratio corresponding to an SEI value of 0.225 kWh/kg. FIG. 15 teaches that each of the mixing rotors 2 of K1 to K9, which have the mixing portion length ratios distributed in a wide range of 0.30-0.53, is capable of producing an obviously smaller gel area ratio than that which the mixing rotor 102 of E1 can produce, that is, 0.64. This also indicates that all of the mixing rotors 2 of K1 to K9 are capable of generating an extensional flow to reduce gel in a material more efficiently, that is, with a smaller specific energy, than E1.

The conclusion drawn from the above-mentioned data is: the mixer which has an inter-rotor clearance CR satisfying at least one of the conditions (1)-(8) and comprises a mixing rotor 2 satisfying the condition (9) is capable of mixing a material with good dispersion.

The present invention is not limited to the above embodiment: the members of the respective examples can be suitably changed in shapes, structures, materials or combinations thereof changed unless departing from the essence of the invention.

The mixing portion 8 in each of the mixing rotors 2, while being provided only at one intermediate position of the mixing rotor 2 in the axial direction according to the above embodiment, may be provided at an upstream or downstream position thereof in the axial direction, or at a plurality of positions. In this latter case, each of the mixing portions 8 may be provided with the inter-rotor clearance.

As described above, the present invention provides continuous mixer and method capable of reliably and efficiently mixing a material having a great viscosity difference between a dispersed phase and a matrix phase.

The continuous mixer provided by the present invention includes: a barrel with a hollow interior; and a pair of mixing rotors which are housed in the barrel and rotate in mutually different directions, each of the mixing rotors including a mixing portion with a plurality of mixing flights formed about an axial center of the mixing rotor and projecting radially outward, wherein both of the mixing rotors are arranged so as to make a center distance therebetween smaller than a rotation outer diameter of each of the mixing flights and forms an inter-rotor clearance which is the smallest clearance between the mixing portions at each rotation phase of the mixing rotors in a cross section perpendicular to axial directions of the both mixing rotors, the inter-rotor clearance satisfying at least one of the following conditions (A) to (C).

(A) The inter-rotor clearance has a size equal to or smaller than 0.16-fold of an inner diameter of the barrel, that is, an inner diameter of a part thereof which part houses one of the mixing rotors, over the rotation region of 85% or more of one rotation of each of the mixing rotors.

(B) The inter-rotor clearance has a size equal to or smaller than 0.1-fold of the inner diameter of the barrel over the rotation region of 59% or more of one rotation of each of the mixing rotors.

(C) The inter-rotor clearance is smaller than 0.07-fold of the inner diameter of the barrel over the rotation region of 34% or more of one rotation of each of the mixing rotors.

Each of the mixing portions preferably forms recesses each provided between the mixing flights adjacent to each other in a circumferential direction, and the pair of mixing rotors preferably rotate such that the mixing flights of one mixing rotor are opposed to the respective recesses of the other mixing rotor.

Furthermore, the inter-rotor clearance preferably has a size equal to or smaller than 0.16-fold of the inner diameter of the barrel over the entire area of one rotation of each of the mixing rotors, more preferably has a size equal to or smaller than 0.07-fold of the inner diameter of the barrel.

Besides, the inter-rotor clearance is preferably smaller than the largest one of clearances formed in directions normal to the inner surface of the barrel between the outer surfaces of the mixing portions and the barrel inner surface over the entire area of one rotation of each of the mixing rotors.

On the other hand, the inter-rotor clearance preferably has a size equal to or larger than 0.02-fold of the inner diameter of the barrel over the entire area of one rotation of each of the mixing rotors.

In the above continuous mixer, the inner diameter of the barrel is preferably equal to or greater than 1.1-fold of the center distance. The mixing portions preferably has such a shape that L/D is 1 or larger when D denotes the diameter of the mixing portions and L denotes the length thereof in an axial direction.

The mixing rotor preferably includes, as the above mixing portion, at least one mixing portion having a diameter D and an axial length L which make a ratio L/D be 1 or larger than 1.

Furthermore, each of the mixing rotors preferably has a total length ratio Ln/L1 which satisfies a condition of $0.30 \le Ln/L1 \le 0.53$ where Ln denotes an axial length of the mixing portion when each of the mixing rotors has the mixing portion in only a single area or denotes a total sum of axial lengths of all of the mixing portions when the mixing rotor has the mixing portion in each of a plurality of areas spaced in the axial direction and L1 denotes an axial length of the portion except supported shaft portions.

On the other hand, a continuous mixing method according to the present invention includes: preparing a continuous mixer including a barrel with a hollow interior and a pair of mixing rotors which are housed in the barrel and rotate in mutually different directions, each of the mixing rotors including a mixing portion with a plurality of mixing flights formed about an axial center of the mixing rotor and projecting radially outward, the pair of mixing rotors being arranged so as to make a center distance therebetween smaller than a rotation outer diameter of each of the mixing flights; and mixing a material by generating an extensional flow in the material passing through an inter-rotor clearance which is the smallest clearance between the mixing portions at each rotation phase of the mixing rotors in a cross section perpendicular to axial directions of the both mixing rotors.

In this mixing method, it is preferable that: the prepared mixer has recesses each formed between the mixing flights adjacent to each other in a circumferential direction in each of the mixing portions; and the mixing rotors are rotated so that the mixing flights of one of the pair of mixing rotors are opposed to the respective recesses of the other mixing rotor.

The invention claimed is:

1. A continuous mixer for continuously mixing a material, comprising:
   a barrel with a hollow interior;
   a hopper positioned to feed a material to be mixed to the interior of the barrel; and a pair of mixing rotors which are housed in the barrel and rotate in mutually different directions, each of the mixing rotors including a feeding portion which is an upstream part in an axial direction, the feeding portion including a first screw flight shaped to feed the material supplied from the hopper to the downstream side through the barrel, a mixing portion which is an intermediate part in the axial direction, the mixing portion including a plurality of mixing flights shaped to mix the material fed from the feeding portion, the mixing flights being formed about an axial center of the mixing rotor and projecting radially outward, and a discharging portion which is a downstream part in the axial direction, the discharging portion including a second screw flight shaped to feed the material mixed by the mixing portion to the downstream side, wherein:

each of the mixing flights is shaped differently from each of the first screw flight and the second screw flight;

the mixing flights each have a tip, a spacing between the tip of one mixing flight of the pair of mixing rotors and the other mixing flight of the pair of mixing rotors comprising an inter-rotor clearance which is a smallest clearance between the mixing portions in a cross section perpendicular to axial directions of both of the mixing rotors at each rotation phase of the mixing rotors, the rotations of the pair of mixing rotors in the mutually different directions causing respective surfaces of the mixing rotors to move in the same direction on the both sides of the inter-rotor clearance;

both of the mixing rotors are arranged so as to make a center distance therebetween smaller than a rotation outer diameter of each of the mixing flights; and the inter-rotor clearance at each rotation phase of the mixing portions of the mixing rotors has a size equal to or smaller than 0.16-fold of an inner diameter of the barrel over a rotation region of 85% or more of one rotation of each of the mixing rotors.

2. A continuous mixer according to claim 1, wherein the inter-rotor clearance has a size equal to or smaller than 0.16-fold of the inner diameter of the barrel over an entire area of one rotation of each of the mixing rotors.

3. A continuous mixer according to claim 1, wherein each of the mixing portions forms recesses, each recess being formed between the mixing flights adjacent to each other in a circumferential direction and the pair of mixing rotors are arranged so as to rotate in such a manner that the mixing flights of one mixing rotor are opposed to the respective recesses of the other mixing rotor.

4. A continuous mixer according to claim 1, wherein the inter-rotor clearance is smaller than the largest one of clearances formed in directions normal to the inner surface of the barrel between the outer surfaces of the mixing portions and the barrel inner surface over an entire area of one rotation of each of the mixing rotors.

5. A continuous mixer according to claim 1, wherein the inter-rotor clearance has a size between 0.02-fold and 0.16-fold of the inner diameter of the barrel over an entire area of one rotation of each of the mixing rotors.

6. A continuous mixer according to claim 1, wherein the inner diameter of the barrel is equal to or greater than 1.1-fold of the center distance.

7. A continuous mixer according to claim 1, wherein the mixing rotor includes at least one mixing portion having a diameter D and an axial length L which make a ratio L/D be 1 or larger than 1.

8. A continuous mixer according to claim 7, wherein each of the mixing rotors has the mixing portion in only a single area and has a total length ratio Ln/L1 which satisfies a condition of $0.30 \leq Ln/L1 \leq 0.53$ where Ln denotes an axial length of the mixing portion and L1 denotes an axial length of the rotor other than a supported portion of the rotor.

9. A continuous mixer according to claim 7, wherein each of the mixing rotors has the mixing portion in each of a plurality of areas spaced in the axial direction and has a total length ratio Ln/L1 which satisfies a condition of $0.30 \leq Ln/L1 \leq 0.53$ where Ln denotes a total sum of axial lengths of all of the mixing portions and L1 denotes an axial length of the rotor other than a supported portion of the rotor.

10. A continuous mixing method for continuously mixing a material, comprising:

preparing a continuous mixer according to claim 1; and mixing the material by generating an extensional flow in the material passing through the inter-rotor clearance.

11. A continuous mixing method according to claim 10, wherein each of the mixing portions in the prepared continuous mixer forms recesses, each recess being formed between the mixing flights adjacent to each other in a circumferential direction, and the mixing rotors are rotated in such a manner that the mixing flights of one of the pair of mixing rotors are opposed to the respective recesses of the other mixing rotor.

12. A continuous mixer for continuously mixing a material, comprising:

a barrel with a hollow interior;

a hopper positioned to feed a material to be mixed to the interior of the barrel; and a pair of mixing rotors which are housed in the barrel and rotate in mutually different directions, each of the mixing rotors including a feeding portion which is an upstream part in an axial direction, the feeding portion including a first screw flight shaped to feed the material supplied from the hopper to the downstream side through the barrel, a mixing portion which is an intermediate part in the axial direction, the mixing portion including a plurality of mixing flights shaped to mix the material fed from the feeding portion, the mixing flights being formed about an axial center of the mixing rotor and projecting radially outward, and a discharging portion which is a downstream part in the axial direction, the discharging portion including a second screw flight shaped to feed the material mixed by the mixing portion to the downstream side, wherein:

each of the mixing flights is shaped differently from each of the first screw flight and the second screw flight;

the mixing flights each have a tip, a spacing between the tip of one mixing flight of the pair of mixing rotors and the other mixing flight of the pair of mixing rotors comprising an inter-rotor clearance which is a smallest clearance between the mixing portions in a cross section perpendicular to axial directions of both of the mixing rotors at each rotation phase of the mixing rotors, the rotations of the pair of mixing rotors in the mutually different directions causing respective surfaces of the mixing rotors to move in the same direction on the both sides of the inter-rotor clearance;

both of the mixing rotors are arranged so as to make a center distance therebetween smaller than a rotation outer diameter of each of the mixing flights; and the inter-rotor clearance at each rotation phase of the mixing portions of the mixing rotors has a size equal to or smaller than 0.1-fold of an inner diameter of the barrel over a rotation region of 59% or more of one rotation of each of the mixing rotors.

13. A continuous mixing method for continuously mixing a material, comprising:
preparing a continuous mixer according to claim 12; and
mixing the material by generating an extensional flow in the material passing through the inter-rotor clearance.

14. A continuous mixing method according to claim 13, wherein each of the mixing portions in the prepared continuous mixer forms recesses, each recess being formed between the mixing flights adjacent to each other in a circumferential direction, and the mixing rotors are rotated in such a manner that the mixing flights of one of the pair of mixing rotors are opposed to the respective recesses of the other mixing rotor.

15. A continuous mixer for continuously mixing a material, comprising:
a barrel with a hollow interior;
a hopper positioned to feed a material to be mixed to the interior of the barrel; and
a pair of mixing rotors which are housed in the barrel and rotate in mutually different directions, each of the mixing rotors including a feeding portion which is an upstream part in an axial direction, the feeding portion including a first screw flight shaped to feed the material supplied from the hopper to the downstream side through the barrel, a mixing portion which is an intermediate part in the axial direction, the mixing portion including a plurality of mixing flights shaped to mix the material fed from the feeding portion, the mixing flights being formed about an axial center of the mixing rotor and projecting radially outward, and a discharging portion which is a downstream part in the axial direction, the discharging portion including a second screw flight shaped to feed the material mixed by the mixing portion to the downstream side, wherein:
each of the mixing flights is shaped differently from each of the first screw flight and the second screw flight;
the mixing flights each have a tip, a spacing between the tip of one mixing flight of the pair of mixing rotors and the other mixing flight of the pair of mixing rotors comprising an inter-rotor clearance which is a smallest clearance between the mixing portions in a cross section perpendicular to axial directions of both of the mixing rotors at each rotation phase of the mixing rotors, the rotations of the pair of mixing rotors in the mutually different directions causing respective surfaces of the mixing rotors to move in the same direction on the both sides of the inter-rotor clearance;
both of the mixing rotors are arranged so as to make a center distance therebetween smaller than a rotation outer diameter of each of the mixing flights; and
the inter-rotor clearance at each rotation phase of the mixing portions of the mixing rotors has a size smaller than 0.07-fold of an inner diameter of the barrel over a rotation region of 34% or more of one rotation of each of the mixing rotors.

16. A continuous mixer according to claim 15, wherein the inter-rotor clearance has a size equal to or smaller than 0.07-fold of the inner diameter of the barrel over an entire area of one rotation of each of the mixing rotors.

17. A continuous mixing method for continuously mixing a material, comprising:
preparing a continuous mixer according to claim 15; and
mixing the material by generating an extensional flow in the material passing through the inter-rotor clearance.

18. A continuous mixing method according to claim 17, wherein each of the mixing portions in the prepared continuous mixer forms recesses, each recess being formed between the mixing flights adjacent to each other in a circumferential direction, and the mixing rotors are rotated in such a manner that the mixing flights of one of the pair of mixing rotors are opposed to the respective recesses of the other mixing rotor.

* * * * *